US007778816B2

(12) United States Patent
Reynar

(10) Patent No.: US 7,778,816 B2
(45) Date of Patent: Aug. 17, 2010

(54) METHOD AND SYSTEM FOR APPLYING INPUT MODE BIAS

(75) Inventor: Jeff Reynar, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 958 days.

(21) Appl. No.: 09/841,265

(22) Filed: Apr. 24, 2001

(65) Prior Publication Data

US 2002/0178008 A1   Nov. 28, 2002

(51) Int. Cl.
G06F 17/27 (2006.01)
(52) U.S. Cl. .................. 704/9; 704/231; 704/251; 704/1; 715/221; 715/222; 715/223; 715/224; 715/225; 715/226; 707/2; 707/3; 707/4; 707/5; 707/6
(58) Field of Classification Search .......... 704/235, 704/9, 10, 251, 1; 707/1–6; 715/505–508, 715/513, 221–226
See application file for complete search history.

(56) References Cited

U.S. PATENT DOCUMENTS

| | | | |
|---|---|---|---|
| 4,674,065 A | 6/1987 | Lange et al. | 364/900 |
| 4,868,750 A | 9/1989 | Kucera et al. | 364/419 |
| 5,020,019 A | 5/1991 | Ogawa | 364/900 |
| 5,128,865 A | 7/1992 | Sadler et al. | 364/419 |
| 5,159,552 A | 10/1992 | van Gasteren et al. | 704/1 |
| 5,267,155 A | 11/1993 | Buchanan et al. | 364/419.14 |
| 5,287,448 A | 2/1994 | Nicol et al. | 715/707 |
| 5,297,039 A | 3/1994 | Kanaegami et al. | 707/5 |
| 5,317,546 A | 5/1994 | Balch et al. | 368/9 |
| 5,337,233 A | 8/1994 | Hofert et al. | 715/540 |
| 5,341,293 A | 8/1994 | Vertelney et al. | 715/530 |
| 5,351,190 A | 9/1994 | Kondo | 704/8 |
| 5,386,564 A | 1/1995 | Shearer et al. | 395/650 |
| 5,392,386 A | 2/1995 | Chalas | 395/155 |

(Continued)

FOREIGN PATENT DOCUMENTS

CA   2 246 920 A1   3/2000

(Continued)

OTHER PUBLICATIONS

Design methodology and formal validation of hypermedia documents; C.A.S. Santos, L.F.G Soares, G.L. de Souza and J.P. Courtiat; *Proceedings of the sixth ACM international conference on multimedia*, (1998) p. 39-48.

(Continued)

*Primary Examiner*—David R Hudspeth
*Assistant Examiner*—Lamont M Spooner
(74) *Attorney, Agent, or Firm*—Merchant & Gould

(57) ABSTRACT

A method and system for applying input mode bias is disclosed. A schema is applied to an input field of an electronic document. The schema is associated with a grammar that defines the set of acceptable strings that may be input into the input field. When text is input into the input field, the schema is determined and the associated grammar is determined. The grammar is then sent to the input method. Based on the grammar, the input method may determine what text the user is trying to enter. The grammar may also be used to apply semantic categories to text input into a document. After the text is entered it is compared to a grammar. If the entered text matches the form of the grammar, then the schema is applied to the text as a semantic category.

25 Claims, 7 Drawing Sheets

U.S. PATENT DOCUMENTS

| | | | | |
|---|---|---|---|---|
| 5,418,902 A | 5/1995 | West et al. ............... 715/503 |
| 5,446,891 A | 8/1995 | Kaplan et al. ............. 395/600 |
| 5,522,089 A | 5/1996 | Kikinis et al. .............. 710/73 |
| 5,535,323 A | 7/1996 | Miller et al. ............... 715/707 |
| 5,541,836 A | 7/1996 | Church et al. ............. 364/419 |
| 5,546,521 A | 8/1996 | Martinez ................... 715/711 |
| 5,581,684 A | 12/1996 | Dudzik et al. ............. 715/708 |
| 5,596,700 A | 1/1997 | Darnell et al. ............. 715/512 |
| 5,617,565 A | 4/1997 | Augenbraun et al. ....... 395/604 |
| 5,625,783 A | 4/1997 | Ezekiel et al. ............. 395/352 |
| 5,627,567 A | 5/1997 | Davidson ................... 345/173 |
| 5,627,958 A | 5/1997 | Potts et al. ................. 715/708 |
| 5,634,019 A | 5/1997 | Koppolu et al. ............ 715/744 |
| 5,640,560 A | 6/1997 | Smith ........................ 395/615 |
| 5,657,259 A | 8/1997 | Davis et al. ................ 708/204 |
| 5,685,000 A | 11/1997 | Cox ............................. 704/9 |
| 5,708,825 A | 1/1998 | Sotomayor ................. 395/762 |
| 5,715,415 A | 2/1998 | Dazey et al. ............... 715/708 |
| 5,717,923 A | 2/1998 | Dedrick ..................... 395/613 |
| 5,752,022 A | 5/1998 | Chiu et al. .................. 395/610 |
| 5,761,689 A | 6/1998 | Rayson et al. .............. 707/533 |
| 5,764,794 A | 6/1998 | Perlin ........................ 382/186 |
| 5,765,156 A | 6/1998 | Guzak et al. ............... 707/100 |
| 5,781,189 A | 7/1998 | Holleran et al. ............ 715/826 |
| 5,781,904 A | 7/1998 | Oren et al. ................. 707/100 |
| 5,794,257 A | 8/1998 | Liu et al. .................... 707/501 |
| 5,799,068 A | 8/1998 | Kikinis et al. ............. 379/93.06 |
| 5,802,253 A | 9/1998 | Gross et al. .................. 395/51 |
| 5,802,262 A | 9/1998 | Van De Vanter ........... 395/180 |
| 5,802,299 A | 9/1998 | Logan et al. ........... 395/200.48 |
| 5,802,530 A | 9/1998 | van Hoff .................... 707/513 |
| 5,805,911 A | 9/1998 | Miller ........................ 395/796 |
| 5,809,318 A | 9/1998 | Rivette ....................... 715/512 |
| 5,815,830 A | 9/1998 | Anthony ....................... 707/6 |
| 5,818,447 A | 10/1998 | Wolf et al. ................. 715/752 |
| 5,821,931 A | 10/1998 | Berquist et al. ............ 715/784 |
| 5,822,539 A | 10/1998 | van Hoff ............... 395/200.66 |
| 5,822,720 A | 10/1998 | Bookman et al. ............. 704/3 |
| 5,826,025 A | 10/1998 | Gramlich .............. 395/200.47 |
| 5,832,100 A | 11/1998 | Lawton et al. .............. 382/100 |
| 5,845,077 A | 12/1998 | Fawcett ...................... 709/221 |
| 5,855,007 A | 12/1998 | Jovicic et al. ................ 705/14 |
| 5,859,636 A | 1/1999 | Pandit ........................ 345/335 |
| 5,872,973 A | 2/1999 | Mitchell et al. ............. 395/685 |
| 5,875,443 A | 2/1999 | Nielsen .......................... 707/2 |
| 5,877,757 A | 3/1999 | Baldwin et al. ............. 715/705 |
| 5,884,266 A | 3/1999 | Dvorak ..................... 704/270.1 |
| 5,892,919 A | 4/1999 | Nielsen ................. 395/200.58 |
| 5,893,073 A | 4/1999 | Kasso et al. ................... 705/8 |
| 5,893,132 A | 4/1999 | Huffman et al. ............ 715/201 |
| 5,895,461 A | 4/1999 | De La Huerga et al. ........ 707/1 |
| 5,896,321 A | 4/1999 | Miller et al. ........... 365/189.01 |
| 5,900,004 A | 5/1999 | Gipson |
| 5,907,852 A | 5/1999 | Yamada ...................... 715/541 |
| 5,913,214 A | 6/1999 | Madnick et al. .............. 707/10 |
| 5,920,859 A | 7/1999 | Li ................................. 707/5 |
| 5,924,099 A | 7/1999 | Guzak et al. ............... 707/100 |
| 5,933,139 A | 8/1999 | Feigner et al. .............. 715/708 |
| 5,933,140 A | 8/1999 | Strahorn et al. ............ 715/712 |
| 5,933,498 A | 8/1999 | Schneck et al. ............... 705/54 |
| 5,940,614 A | 8/1999 | Allen et al. ................. 717/120 |
| 5,944,787 A | 8/1999 | Zoken ........................ 709/206 |
| 5,946,647 A | 8/1999 | Miller et al. .................. 704/9 |
| 5,948,061 A | 9/1999 | Merriman et al. ........... 709/219 |
| 5,956,681 A * | 9/1999 | Yamakita ................... 704/260 |
| 5,974,413 A * | 10/1999 | Beauregard et al. ............ 707/6 |
| 5,987,480 A | 11/1999 | Donohue et al. ......... 715/501.1 |
| 5,991,719 A | 11/1999 | Yazaki et al. ............... 704/251 |
| 5,995,756 A | 11/1999 | Hermann ................... 395/712 |
| 6,006,265 A | 12/1999 | Rangan et al. .............. 709/226 |
| 6,006,279 A | 12/1999 | Hayes ........................ 719/328 |
| 6,014,616 A * | 1/2000 | Kim .............................. 704/8 |
| 6,018,761 A | 1/2000 | Uomini ...................... 706/206 |
| 6,028,605 A | 2/2000 | Conrad et al. .............. 345/840 |
| 6,029,135 A | 2/2000 | Krasle ........................ 704/275 |
| 6,029,171 A | 2/2000 | Smiga et al. ................ 707/102 |
| 6,031,525 A | 2/2000 | Perlin ......................... 345/173 |
| 6,052,531 A | 4/2000 | Waldin et al. ............... 717/170 |
| 6,061,516 A * | 5/2000 | Yoshikawa et al. .......... 717/109 |
| 6,067,087 A | 5/2000 | Krauss et al. ............... 345/352 |
| 6,072,475 A | 6/2000 | Van Ketwich ............... 345/173 |
| 6,073,090 A | 6/2000 | Fortune et al. ................. 704/8 |
| 6,085,201 A | 7/2000 | Tso ............................ 707/505 |
| 6,088,711 A | 7/2000 | Fein et al. ................... 715/523 |
| 6,092,074 A | 7/2000 | Rodkin et al. ............... 707/102 |
| 6,108,640 A | 8/2000 | Slotznick ..................... 705/26 |
| 6,108,674 A | 8/2000 | Murakami et al. .......... 707/515 |
| 6,112,209 A | 8/2000 | Gusack ....................... 707/101 |
| 6,121,968 A | 9/2000 | Arcuri et al. ................ 345/352 |
| 6,122,647 A | 9/2000 | Horowitz et al. |
| 6,126,306 A | 10/2000 | Ando ......................... 708/605 |
| 6,137,911 A | 10/2000 | Zhilyaev .................... 382/225 |
| 6,141,005 A | 10/2000 | Hetherington et al. ...... 345/333 |
| 6,151,643 A | 11/2000 | Cheng et al. ................. 710/36 |
| 6,154,738 A | 11/2000 | Call ............................... 707/4 |
| 6,167,469 A | 12/2000 | Safai et al. ................... 710/62 |
| 6,167,523 A * | 12/2000 | Strong ......................... 726/21 |
| 6,167,568 A | 12/2000 | Gandel et al. ............... 717/176 |
| 6,173,316 B1 | 1/2001 | De Boor et al. ............. 709/218 |
| 6,182,029 B1 * | 1/2001 | Friedman ....................... 704/9 |
| 6,185,550 B1 | 2/2001 | Snow et al. .................... 707/1 |
| 6,185,576 B1 | 2/2001 | McIntosh ................... 707/200 |
| 6,199,046 B1 | 3/2001 | Heinzle et al. ................. 705/1 |
| 6,199,081 B1 | 3/2001 | Meyerzon et al. ........... 715/513 |
| 6,208,338 B1 | 3/2001 | Fischer et al. ............... 715/705 |
| 6,219,698 B1 | 4/2001 | Iannucci et al. ............. 709/221 |
| 6,246,404 B1 | 6/2001 | Feigner et al. .............. 715/708 |
| 6,262,728 B1 | 7/2001 | Alexander ................ 345/440.1 |
| 6,272,074 B1 | 8/2001 | Winner ........................ 368/10 |
| 6,272,505 B1 | 8/2001 | De La Huerga ............. 707/501 |
| 6,282,489 B1 | 8/2001 | Bellesfield et al. .......... 701/201 |
| 6,291,785 B1 | 9/2001 | Koga et al. .................. 209/584 |
| 6,292,768 B1 | 9/2001 | Chan ............................ 704/1 |
| 6,295,061 B1 | 9/2001 | Park et al. ................... 715/764 |
| 6,297,822 B1 | 10/2001 | Feldman ..................... 715/765 |
| 6,300,950 B1 | 10/2001 | Clark et al. ................. 715/705 |
| 6,308,171 B1 | 10/2001 | De La Huerga ............... 707/3 |
| 6,311,152 B1 | 10/2001 | Bai et al. ....................... 704/9 |
| 6,311,177 B1 | 10/2001 | Dauerer et al. ................ 707/2 |
| 6,311,194 B1 | 10/2001 | Sheth et al. ................. 715/505 |
| 6,320,496 B1 | 11/2001 | Sokoler et al. ........... 340/470.1 |
| 6,323,853 B1 | 11/2001 | Hedloy ....................... 345/339 |
| 6,336,125 B2 | 1/2002 | Noda et al. ................. 715/531 |
| 6,336,131 B1 | 1/2002 | Wolfe et al. ................ 709/203 |
| 6,338,059 B1 | 1/2002 | Fields et al. ................... 707/4 |
| 6,339,436 B1 | 1/2002 | Amro et al. ................. 715/714 |
| 6,339,755 B1 * | 1/2002 | Hetherington et al. .......... 704/8 |
| 6,347,398 B1 | 2/2002 | Parthasarathy et al. ...... 717/170 |
| 6,349,295 B1 | 2/2002 | Tedesco et al. ................ 707/3 |
| 6,353,926 B1 | 3/2002 | Parthesarathy et al. ........ 717/11 |
| 6,381,742 B2 | 4/2002 | Forbes et al. ................ 717/176 |
| 6,382,350 B1 | 5/2002 | Jezewski et al. ............ 181/290 |
| 6,392,668 B1 | 5/2002 | Murray ........................ 715/38 |
| 6,396,515 B1 | 5/2002 | Hetherington et al. ...... 715/762 |
| 6,401,067 B2 * | 6/2002 | Lewis et al. ................. 704/275 |
| 6,408,323 B1 | 6/2002 | Kobayashi et al. .......... 709/100 |
| 6,413,100 B1 | 7/2002 | Dickmeyer et al. ......... 434/322 |
| 6,415,304 B1 | 7/2002 | Horvitz ....................... 715/205 |
| 6,421,678 B2 | 7/2002 | Smiga et al. ................ 707/102 |
| 6,424,979 B1 | 7/2002 | Livingston et al. .......... 715/511 |
| 6,434,567 B1 * | 8/2002 | De La Huerga ............. 707/102 |
| 6,438,545 B1 | 8/2002 | Beauregard |
| 6,441,753 B1 | 8/2002 | Montgomery ................ 341/34 |
| 6,442,545 B1 | 8/2002 | Feldman et al. ................ 707/8 |

| Patent No. | Date | Inventor | Class |
|---|---|---|---|
| 6,442,591 B1 | 8/2002 | Haynes et al. | 709/206 |
| 6,456,304 B1 | 9/2002 | Anguilo et al. | 715/779 |
| 6,470,091 B2 | 10/2002 | Koga et al. | 382/101 |
| 6,473,069 B1 | 10/2002 | Gerpheide | 345/157 |
| 6,477,510 B1 | 11/2002 | Johnson | 705/30 |
| 6,480,860 B1 | 11/2002 | Monday | 707/102 |
| 6,493,006 B1 | 12/2002 | Gourdol et al. | 395/825 |
| 6,498,982 B2 | 12/2002 | Bellesfield et al. | 701/202 |
| 6,510,504 B2 | 1/2003 | Satyanarayanan | 711/170 |
| 6,516,321 B1 | 2/2003 | De La Huerga | 707/102 |
| 6,519,557 B1 | 2/2003 | Emens et al. | 704/8 |
| 6,519,603 B1 | 2/2003 | Bays et al. | |
| 6,546,433 B1 * | 4/2003 | Matheson | 719/318 |
| 6,553,385 B2 | 4/2003 | Johnson et al. | 707/104.1 |
| 6,556,972 B1 | 4/2003 | Bakis et al. | 704/277 |
| 6,556,984 B1 | 4/2003 | Zien | 707/2 |
| 6,564,264 B1 | 5/2003 | Creswell et al. | 709/245 |
| 6,571,241 B1 | 5/2003 | Nosohara | 707/6 |
| 6,571,253 B1 * | 5/2003 | Thompson et al. | 707/103 R |
| 6,591,260 B1 | 7/2003 | Schwarzhoff et al. | 707/2 |
| 6,595,342 B1 | 7/2003 | Maritzen et al. | 194/212 |
| 6,601,075 B1 | 7/2003 | Huang et al. | 707/104.1 |
| 6,604,099 B1 | 8/2003 | Chung et al. | 707/3 |
| 6,615,131 B1 * | 9/2003 | Rennard et al. | 701/200 |
| 6,618,733 B1 | 9/2003 | White et al. | |
| 6,622,140 B1 | 9/2003 | Kantrowitz | 707/5 |
| 6,623,527 B1 | 9/2003 | Hamzy | 715/513 |
| 6,625,581 B1 | 9/2003 | Perkowski | 705/27 |
| 6,629,079 B1 | 9/2003 | Spiegel et al. | 705/26 |
| 6,631,519 B1 | 10/2003 | Nicholson et al. | 717/169 |
| 6,636,880 B1 | 10/2003 | Bera | 708/206 |
| 6,643,650 B1 | 11/2003 | Slaughter et al. | 707/10 |
| 6,654,734 B1 | 11/2003 | Mani et al. | 707/2 |
| 6,654,932 B1 * | 11/2003 | Bahrs et al. | 715/507 |
| 6,658,623 B1 | 12/2003 | Schilit et al. | 715/513 |
| 6,687,485 B2 | 2/2004 | Hopkins et al. | 434/350 |
| 6,694,307 B2 | 2/2004 | Julien | 707/3 |
| 6,697,824 B1 | 2/2004 | Bowman-Amuah | 709/229 |
| 6,697,837 B1 | 2/2004 | Rodov | 709/203 |
| 6,708,189 B1 | 3/2004 | Fitzsimons et al. | 707/205 |
| 6,715,144 B2 | 3/2004 | Daynes et al. | 717/174 |
| 6,717,593 B1 | 4/2004 | Jennings | 715/760 |
| 6,718,516 B1 | 4/2004 | Claussen et al. | 715/513 |
| 6,728,679 B1 * | 4/2004 | Strubbe et al. | 704/270.1 |
| 6,732,090 B2 | 5/2004 | Shanahan et al. | 707/3 |
| 6,732,361 B1 | 5/2004 | Andreoli et al. | 719/313 |
| 6,741,994 B1 * | 5/2004 | Kang et al. | 707/102 |
| 6,742,054 B1 * | 5/2004 | Upton, IV | 710/6 |
| 6,745,208 B2 | 6/2004 | Berg et al. | 707/201 |
| 6,766,326 B1 | 7/2004 | Cena | 707/101 |
| 6,795,808 B1 * | 9/2004 | Strubbe et al. | 704/275 |
| 6,802,061 B1 | 10/2004 | Parthasarathy et al. | 717/173 |
| 6,826,726 B2 | 11/2004 | Hsing et al. | 715/513 |
| 6,829,631 B1 | 12/2004 | Forman et al. | 709/202 |
| 6,845,499 B2 | 1/2005 | Srivastava et al. | 717/100 |
| 6,857,103 B1 | 2/2005 | Wason | 715/709 |
| 6,859,908 B1 | 2/2005 | Clapper | 715/224 |
| 6,868,525 B1 * | 3/2005 | Szabo | 715/738 |
| 6,874,125 B2 | 3/2005 | Carroll et al. | 715/705 |
| 6,874,143 B1 | 3/2005 | Murray et al. | 717/173 |
| 6,880,129 B1 | 4/2005 | Lee et al. | 715/763 |
| 6,883,137 B1 | 4/2005 | Girardot et al. | 707/513 |
| 6,898,604 B1 | 5/2005 | Ballinger et al. | 707/101 |
| 6,901,402 B1 | 5/2005 | Corston-Oliver et al. | 701/101 |
| 6,904,560 B1 | 6/2005 | Panda | 715/202 |
| 6,925,457 B2 | 8/2005 | Britton et al. | 707/1 |
| 6,925,470 B1 | 8/2005 | Sangudi et al. | 707/102 |
| 6,944,857 B1 | 9/2005 | Glaser et al. | 717/173 |
| 6,948,133 B2 | 9/2005 | Haley | 715/780 |
| 6,950,831 B2 * | 9/2005 | Haley | 707/104.1 |
| 6,950,982 B1 | 9/2005 | Dourish | 715/512 |
| 6,957,385 B2 | 10/2005 | Chan et al. | 715/504 |
| 6,963,867 B2 | 11/2005 | Ford et al. | 707/3 |
| 6,964,010 B1 * | 11/2005 | Sharp | 715/507 |
| 6,975,983 B1 * | 12/2005 | Fortescue et al. | 704/9 |
| 6,976,090 B2 | 12/2005 | Ben-Shaul et al. | 709/246 |
| 6,976,209 B1 | 12/2005 | Storisteanu et al. | 715/512 |
| 6,981,212 B1 | 12/2005 | Claussen et al. | 715/205 |
| 6,986,104 B2 | 1/2006 | Green et al. | 715/523 |
| 6,990,654 B2 | 1/2006 | Carroll, Jr. | 717/109 |
| 7,003,522 B1 | 2/2006 | Reynar et al. | 707/10 |
| 7,013,289 B2 | 3/2006 | Horn et al. | 705/26 |
| 7,024,658 B1 | 4/2006 | Cohen et al. | 717/117 |
| 7,028,312 B1 | 4/2006 | Merrick et al. | 719/330 |
| 7,032,174 B2 | 4/2006 | Montero et al. | 715/257 |
| 7,039,859 B1 | 5/2006 | Sundaresan | 715/229 |
| 7,051,076 B2 | 5/2006 | Tsuchiya | 709/206 |
| 7,082,392 B1 * | 7/2006 | Butler et al. | 704/233 |
| 7,100,115 B1 | 8/2006 | Yennaco | 715/748 |
| 7,113,976 B2 | 9/2006 | Watanabe | 709/206 |
| 7,146,564 B2 | 12/2006 | Kim et al. | 715/235 |
| 7,216,351 B1 * | 5/2007 | Maes | 719/328 |
| 7,237,190 B2 | 6/2007 | Rollins et al. | 715/234 |
| 7,281,245 B2 | 10/2007 | Reynar et al. | 717/173 |
| 7,302,634 B2 | 11/2007 | Lucovsky et al. | 715/200 |
| 7,305,354 B2 * | 12/2007 | Rodriguez et al. | 705/26 |
| 7,392,479 B2 | 6/2008 | Jones et al. | 715/513 |
| 7,421,645 B2 | 9/2008 | Reynar | 715/206 |
| 7,454,459 B1 | 11/2008 | Kapoor et al. | 709/203 |
| 2001/0029605 A1 | 10/2001 | Forbes et al. | 717/11 |
| 2001/0041328 A1 * | 11/2001 | Fisher | 434/157 |
| 2001/0042098 A1 | 11/2001 | Gupta et al. | 709/206 |
| 2001/0049702 A1 | 12/2001 | Najmi | 707/513 |
| 2001/0056461 A1 | 12/2001 | Kampe et al. | 709/201 |
| 2002/0002590 A1 | 1/2002 | King et al. | 709/206 |
| 2002/0003469 A1 | 1/2002 | Gupta | 340/407.1 |
| 2002/0003898 A1 | 1/2002 | Wu | 382/187 |
| 2002/0004803 A1 | 1/2002 | Serebrennikov | 715/513 |
| 2002/0007309 A1 | 1/2002 | Reynar | 705/14 |
| 2002/0023113 A1 | 2/2002 | Hsing et al. | 707/513 |
| 2002/0023136 A1 | 2/2002 | Silver et al. | 709/206 |
| 2002/0026450 A1 * | 2/2002 | Kuramochi | 707/104.1 |
| 2002/0029304 A1 | 3/2002 | Reynar et al. | 709/332 |
| 2002/0035581 A1 | 3/2002 | Reynar et al. | 707/513 |
| 2002/0038180 A1 | 3/2002 | Bellesfield et al. | 701/202 |
| 2002/0065110 A1 | 5/2002 | Enns et al. | 455/566 |
| 2002/0065901 A1 | 5/2002 | Malik | 709/206 |
| 2002/0066073 A1 | 5/2002 | Lienhard et al. | 717/105 |
| 2002/0078222 A1 | 6/2002 | Compas et al. | 709/232 |
| 2002/0091803 A1 | 7/2002 | Imamura et al. | 709/220 |
| 2002/0099687 A1 | 7/2002 | Krishnaprasad et al. | 707/1 |
| 2002/0100036 A1 | 7/2002 | Moshir et al. | 717/173 |
| 2002/0103829 A1 | 8/2002 | Manning et al. | 707/513 |
| 2002/0104080 A1 | 8/2002 | Woodard et al. | 717/176 |
| 2002/0110225 A1 | 8/2002 | Cullis | 379/67.1 |
| 2002/0111928 A1 * | 8/2002 | Haddad | 707/1 |
| 2002/0120685 A1 | 8/2002 | Srivastava et al. | 709/203 |
| 2002/0129107 A1 | 9/2002 | Loughran et al. | 709/206 |
| 2002/0133523 A1 | 9/2002 | Ambler et al. | 715/536 |
| 2002/0149601 A1 | 10/2002 | Rajarajan et al. | 345/619 |
| 2002/0156774 A1 | 10/2002 | Beauregard et al. | 707/3 |
| 2002/0156792 A1 | 10/2002 | Gombocz et al. | 707/100 |
| 2002/0169802 A1 | 11/2002 | Brewer et al. | 707/513 |
| 2002/0175955 A1 | 11/2002 | Gourdol et al. | 345/821 |
| 2002/0178182 A1 | 11/2002 | Wang et al. | 715/501.1 |
| 2002/0184247 A1 | 12/2002 | Jokela et al. | 707/204 |
| 2002/0188941 A1 | 12/2002 | Cicciarelli et al. | 717/175 |
| 2002/0196281 A1 | 12/2002 | Audleman et al. | 345/762 |
| 2002/0198909 A1 | 12/2002 | Huynh et al. | 707/513 |
| 2003/0002391 A1 | 1/2003 | Biggs | 368/82 |
| 2003/0005411 A1 | 1/2003 | Gerken | 717/120 |
| 2003/0009489 A1 | 1/2003 | Griffin | 707/500 |
| 2003/0014745 A1 | 1/2003 | Mah et al. | 717/170 |
| 2003/0025728 A1 | 2/2003 | Ebbo et al. | 345/744 |
| 2003/0046316 A1 * | 3/2003 | Gergic et al. | 707/513 |
| 2003/0050911 A1 | 3/2003 | Lucovsky et al. | 707/1 |

| | | | |
|---|---|---|---|
| 2003/0051236 A1 | 3/2003 | Pace et al. | 717/177 |
| 2003/0056207 A1 | 3/2003 | Fischer et al. | 717/174 |
| 2003/0081791 A1 | 5/2003 | Erickson et al. | 380/282 |
| 2003/0083910 A1 | 5/2003 | Sayal et al. | 705/7 |
| 2003/0084138 A1 | 5/2003 | Tavis et al. | 709/223 |
| 2003/0097318 A1 | 5/2003 | Yu et al. | 705/35 |
| 2003/0101190 A1 | 5/2003 | Horvitz et al. | 707/100 |
| 2003/0101204 A1 | 5/2003 | Watson | 708/206 |
| 2003/0101416 A1 | 5/2003 | McInnes et al. | 715/513 |
| 2003/0106040 A1 | 6/2003 | Rubin et al. | 717/106 |
| 2003/0115039 A1 | 6/2003 | Wang | 704/4 |
| 2003/0121033 A1 | 6/2003 | Peev et al. | 717/175 |
| 2003/0126136 A1 | 7/2003 | Omoigui | 707/10 |
| 2003/0140308 A1 | 7/2003 | Murthy et al. | 715/500 |
| 2003/0154144 A1 | 8/2003 | Pokorny et al. | 705/28 |
| 2003/0158841 A1 | 8/2003 | Britton et al. | 707/3 |
| 2003/0158851 A1 | 8/2003 | Britton et al. | 707/100 |
| 2003/0167445 A1 | 9/2003 | Su et al. | 715/513 |
| 2003/0172343 A1 | 9/2003 | Leymaster et al. | 715/500 |
| 2003/0177341 A1 | 9/2003 | Devillers | 712/227 |
| 2003/0182391 A1 | 9/2003 | Leber et al. | 709/217 |
| 2003/0192040 A1 | 10/2003 | Vaughan | 717/173 |
| 2003/0195937 A1 | 10/2003 | Kircher et al. | 709/207 |
| 2003/0212527 A1 | 11/2003 | Moore et al. | 702/179 |
| 2003/0220795 A1 | 11/2003 | Araysantiparb et al. | 704/275 |
| 2003/0229593 A1 | 12/2003 | Raley et al. | 705/55 |
| 2003/0233330 A1 | 12/2003 | Raley et al. | 705/55 |
| 2004/0002939 A1 | 1/2004 | Arora et al. | 707/1 |
| 2004/0003389 A1 | 1/2004 | Reynar et al. | 717/178 |
| 2004/0006564 A1 | 1/2004 | Lucovsky et al. | 707/10 |
| 2004/0006741 A1 | 1/2004 | Radja et al. | 715/513 |
| 2004/0024875 A1 | 2/2004 | Horvitz et al. | 709/226 |
| 2004/0039990 A1 | 2/2004 | Bakar et al. | 715/505 |
| 2004/0044959 A1 | 3/2004 | Shanmugasundaram et al. | 715/513 |
| 2004/0068694 A1 | 4/2004 | Kaler et al. | 715/513 |
| 2004/0083218 A1 | 4/2004 | Feng | 707/100 |
| 2004/0133846 A1 | 7/2004 | Khoshatefeh et al. | 715/500 |
| 2004/0143581 A1 | 7/2004 | Bohannon et al. | 707/100 |
| 2004/0165007 A1 | 8/2004 | Shafron | 345/781 |
| 2004/0199861 A1 | 10/2004 | Lucovsky | 715/500 |
| 2004/0201867 A1 | 10/2004 | Katano | 358/1.15 |
| 2004/0236717 A1 | 11/2004 | Demartini et al. | 707/1 |
| 2005/0050164 A1 | 3/2005 | Burd et al. | 709/217 |
| 2005/0055330 A1 | 3/2005 | Britton et al. | 707/1 |
| 2005/0094850 A1* | 5/2005 | Nakao | 382/103 |
| 2005/0108195 A1 | 5/2005 | Yalovsky et al. | 707/1 |
| 2005/0120313 A1 | 6/2005 | Rudd et al. | 715/866 |
| 2005/0187926 A1 | 8/2005 | Britton et al. | 707/3 |
| 2006/0173674 A1* | 8/2006 | Nakajima et al. | 704/9 |

FOREIGN PATENT DOCUMENTS

| | | |
|---|---|---|
| CN | ZL 200410005390.8 | 10/2008 |
| EP | 0 364 180 A2 | 4/1990 |
| EP | 0481784 A2 | 4/1992 |
| EP | 0598511 A2 | 5/1994 |
| EP | 0 872 827 A2 | 10/1998 |
| EP | 0810520 B1 | 12/1998 |
| EP | 1093058 A1 | 4/2001 |
| EP | 1280068 A2 | 1/2003 |
| EP | 1361523 A2 | 11/2003 |
| EP | 1376392 A2 | 1/2004 |
| EP | 1 447 754 A1 | 8/2004 |
| EP | 1 452 966 A3 | 9/2004 |
| JP | 64-88771 | 4/1989 |
| JP | 05-174013 | 7/1993 |
| JP | 08-272662 | 10/1996 |
| JP | 09-138636 | 5/1997 |
| JP | 10-171827 | 6/1998 |
| JP | 2000-222394 | 8/2000 |
| JP | 2000-231566 | 8/2000 |
| JP | 2001-014303 | 1/2001 |
| JP | 2001-125994 | 5/2001 |
| JP | 2001-522112 | 11/2001 |
| JP | 2001-0350464 | 12/2001 |
| JP | 2002-041353 | 2/2002 |
| JP | 2002163250 A | 6/2002 |
| JP | 2002-222181 | 8/2002 |
| JP | 2003-141174 | 5/2003 |
| WO | WO 95/07510 A1 | 3/1995 |
| WO | WO 99/17240 A1 | 4/1999 |
| WO | WO 00/54174 A1 | 9/2000 |
| WO | WO 00/67117 | 11/2000 |
| WO | WO 00/73949 A1 | 12/2000 |
| WO | WO 01/18687 A1 | 3/2001 |
| WO | WO 01/37170 A2 | 5/2001 |
| WO | WO 01/86390 A2 | 11/2001 |
| WO | WO 02/99627 A1 | 1/2002 |
| WO | WO 02/15518 A2 | 2/2002 |
| WO | WO 02/42928 A1 | 5/2002 |
| WO | WO 2004/012099 A2 | 2/2004 |

OTHER PUBLICATIONS

Constructing, organizing, and visualizing collections of tropically related Web resources; Loren Terveen, Will Hill and Brian Amento; *ACM Trans. Comput.-um. Interact 6*, 1 (Mar. 1999) p. 67-94.

How to personalize the Web; Rob Barrett, Paul P. Maglio and Daniel C. Kellem; *Conference proceedings on human factors in computing systems* (1997) p. 75-82.

Clues: dynamic personalized message filtering; Matthew Marx and Chris Schmandt; *Proceedings of the ACM 1996 conference on computer supported cooperative work* (1996) p. 113-121.

Dynamic hyperlink generation for navigation in relational databases; Karl M. Goschka and Jurgen Falb*Proceedings of the tenth ACM conference on hypertext and hypermedia: returning to our diverse roots* (1999) p. 23-24.

Perceptual user interfaces: perceptual intelligence; Alex Pentland; *Commun. ACM 43*,3 (Mar. 2000) p. 35-44.

Textual context analysis for information retrieval; Mark A. Stairmand; *Proceedings of the 20th annual international ACM SIGIR conference on research and development in information retrieval* (1997) p. 140-147.

*An XML framework for agent-based E-commerce*; Robert J. Glushko, Jay M. Tenenbaum and Bart Meltzer; Commun. ACM 42, 3 (Mar. 1999) p. 106.

Technique for Automatically Correcting Words in Text; Karen Kukich;*ACM Comput. Surv.*, 24, 4 (Dec. 1992); pp. 377-439.

Putting People First: Specifying Proper Names in Speech Interfaces; Matt Marx and Chris Schmandt; *Proceedings of the ACM Symposium on User Interface Software and Technology*; 1994; pp. 29-37.

U.S. Appl. No. 09/818,157, filed Mar. 27, 2001, entitled "Automatically Adding Proper Names to a Database."

U.S. Appl. No. 09/841,266, filed Apr. 24, 2001, entitled "Method and System for Providing Electronic Commerce Actions Based on Semantically Labeled Strings."

U.S. Appl. No. 09/906,552, filed Jul. 16, 2001, entitled "Method and System for Providing Restricted Actions for Recognized Semantic Categories."

U.S. Appl. No. 09/906,467, filed Jul. 16, 2001, entitled "Application Program Interfaces for Semantically Labeling Strings and Providing Actions Based on Semantically Labeled Strings."

U.S. Appl. No. 09/907,418, filed Jul. 17, 2001, entitled "Method and System for Defining Semantic Categories and Actions."

U.S. Appl. No. 09/588,411, filed Jun. 6, 2000, entitled "Method and System for Semantically Labeling Strings and Providing Actions Based on Semantically Labeled Strings."

U.S. Appl. No. 10/141,712, filed May 9, 2002, entitled "Method, System, and Apparatus for Converting Dates Between Calendars and Languages Based Upon Semantically Labeled Strings."

U.S. Appl. No. 10/154,630, filed May 23, 2002, entitled "Method, System, and Apparatus for Converting Numbers Based Upon Semantically Labeled Strings."

U.S. Appl. No. 10/140,544, filed May 7, 2002, entitled "Method, System, and Apparatus for Converting Numbers Between Measurement Systems Based Upon Semantically Labeled Strings."
U.S. Appl. No. 10/155,680, filed May 23, 2002, entitled "Method, System, and Apparatus for Converting Currency Values Based Upon Semantically Labeled Strings."
U.S. Appl. No. 10/179,810, filed Jun. 25, 2002, enitled "Method, System, and Apparatus for Performing Custom Actions on Digital Content."
U.S. Appl. No. 10/178,680, filed Jun. 24, 2002, entitled "System and Method for Incorporating Smart Tags in Online Content."
U.S. Appl. No. 10/179,438, filed Jun. 25, 2002, entitled "Method and System for Dynamically Providing Actions Associated with Semantically Labeled Strings."
U.S. Appl. No. 10/184,298, filed Jun. 27, 2002, entitled "Method and System for Associating Actions with Semantic Labels in Electronic Documents."
U.S. Appl. No. 10/426,446, filed Apr. 29, 2003, Feinberg et al.
Kuenning, Geoff, "Using ISPELL from Emacs", http://theochem.ki.ku.dk/on_line_docs/ispell/ispell_1.html, 4 pp., publication date unknown.
"Spellout Command", Commands Reference, vol. 5, http://www.rz.uni-hohenheim.de/betriebssysteme/unix/aix/ aix_4.3.3_doc/base_doc/usr/ share/man/inf..., 1 page, publication date unknown.
"Chapter 8—Standard Input and Output", http://www.comp.lancs.ac.uk/computing/users/eiamjw/unix/chap8.html, 3 pp., publication date unknown.
Panagiotis, Christias, Man-cgi 1.15, http://www.physics.umn,edu/cgi-bin/man-cgi?spell, 1994, 5 pp.
Bischof, Hans-Peter, "Spell, Spellin, Spellout—Finding Spelling Errors", http://www.vorlesungen.uni-osnabrueck.de/informatik/shellscript/Html/Man/_Man_NeXT_html/html..., Apr. 21, 1997, 2 pp.
"Module 123—Spell", http://duplex.hypermart.net/books/bsd/501-504.html, 4 pp., publication date unknown.
Panagiotis, Christias, Man-cgi 1.15, http://www.calpoly.edu/cgi-bin/man-cgi?spell+1, 1994, 3 pp.
Martensson, Bengt, "Thread-Enhanced Spell Front End for GNU Emacs + Detex + Delatex", http://www.geocrawler.com/archives/3/337/1987/8/0/1871981/, Aug. 20, 1987, 1 page.
Willisson, Pace, Ispell (1), http://www.rt.com/man/findaffix.1.html, 1983, 15 pp.
Willisson, Pace, Ispell (1), "User Commands", http://www.csee.usf.edu/cgi-bin/man-cgi?ispell, 1983, 18 pp.
"Handout 38: Spell Checking, Word Counting, and Textual Analysis", http://courses.cs.emporia.edu/pheattch/courses/2002/cs501s02/hand38/, 3 pp., publication date unknown.
Keunning, Geoff, "International Spell", http://fmg-www.cs.ucla.edu/geoff.ispell.html, 3 pp., publication date unknown.
Ispell 4, "Ispell—Format of Ispell Dictionaries and Affix Files", http://www.bigbiz.com/cgi-bin/manpage?4+ispell, 11 pp., publication date unknown.
McMahon, Lee. E., "SED—A Non-Interactive Text Editor," Bell Laboratories, Murray Hill, New Jersey 07974, Aug. 15, 1978, pp. 1-19.
*The Complete LINUX™ Operating System 5.2 Deluxe*, Red Hat,® Macmillian Digital Publishing USA, A Viacom Company, Red Hat Software, Inc., ISBN 1-57595-199-1B, 1995-1998, pp. 1-385.
*User Manual For AddressMate and AddressMate Plus*, CoStar Corporation, AddressMate Software, 1994-1995, pp. 1-210.
*Getting Results With Microsoft® Office 97, Real World Solutions For The Work You Do*, Microsoft Corporation, 1995-1997, pp. 1-703.
InfoCentral™ 7, User's Manual, Corel Corporation, vol. 1, Version 7.0, 1996, pp. 1-86.
Corel® Office Professional 7 Quick Results User's Manual, vol. 1, Version 7.0 (first printing), Corel Corporation, Limited, pp. 1-531, publication date unknown.
Novell GroupWise User's Guide for Windows 16-Bit Version 5.2, Novell, Inc., 1993-1997, pp. 1-231.
Novell GroupWise User's Guide for Windows 32-Bit Version 5.2, Novell, Inc., 1998, pp. 1-318.
Claris Em@iler Getting Started User's Guide, For Macintosh, Claris Corporation, 1995-1997, 61 pp.

Developer's Guide To Apple Data Detectors, For Version 1.0.2., Apple Computer, Inc., 1997, pp. 3, 7-9 16-33.
Apple Data Detectors User's Manual, Apple Computer, Inc., 1997, pp. 1-15.
Nardi, Bonnie A.; Miller, James R.; Wright, David J., "Collaborative, Programmable Intelligent Agents," Jim Miller/Miramontes Computing, Apple Computer Advanced Technology Group, http://www.miramontes.com/writing/add-cacm/add-cacm/html, Mar. 1998, pp. 1-11.
Exploring the applications user-expertise assessment for intelligent interfaces; Michel C. Desmarais and Jiming Liu; *Proceedings of the conference on human factors in computing systems*, (1993) p. 308-313.
Beitner, N.D.; Hall, W.; Goble, C.A., "Multimedia Support and Authoring in Microcosm: An Extended Model," Dept. of Electronics and Computer Science, Univ. of Southampton, Southampton SO17 1BJ, UK: Dept. of Computer Science, Univ. of Manchester, Oxford Road, Manchester M13 9PL, UK, pp. 1-12, publication date unknown.
IBM Corporation, "IBM Research Disclosure #368; Multimedia Hyperlinks Automatically Created For Reference Documents," *IBM Technical Disclosure* Bulletin, Jun. 1993, pp. 1-5.
U.S. Final Official Action dated Aug. 18, 2006 cited in U.S. Appl. No. 09/907,418.
Interface and execution models in the fluke kernel, Bryan Ford, Mike Hibler, Jay Lepreau, Roland McGrath and Patrick Tullman; *Proceedings of the third symposium on operating systems design and implementation* (1999) p. 10-1115.
Future directions in user-computer interface software, James D. Foley; *Conference proceedings on organizational computer systems*. (1991) p. 289-297.
Human-computer interface development: concepts and systems for its management; H. Rex Hartson and Deborah Hix; *ACM Comput. Surv.* I (Mar. 1989) p. 5-92.
Integrating computer technology, people technology; strategies and case studies from Georgia Tech's Graphics, Visualization and Usability Center: Jim Foley: *Proceedings of the workshop on advanced visual interfaces*. (1994) p. 3443.
Command management system for next-generation user input; M. Tsai, P. Reiher and G.J. Popck; *Proceedings of the seventh workshop on hottopics in operating systems*. (1999) p. 17984.
U.S. Official Action dated Aug. 9, 2006 cited in U.S. Appl. No. 10/164,960.
U.S. Final Official Action dated Jul. 19, 2006 in U.S. Appl. No. 09/906,552.
U.S. Official Action dated Aug. 2, 2006 in U.S. Appl. No. 10/731,899.
U.S. Official Action dated May 26, 2006 in U.S. Appl. No. 09/588,411.
U.S. Official Action dated May 31, 2006 in U.S. Appl. No. 10/141,712.
U.S. Official Action dated Jun. 1, 2006 in U.S. Appl. No. 10/366,141.
U.S. Appl. No. 11/396,937, filed Apr. 3, 2006, entitled "Automatically Adding Proper Names to a Database".
U.S. Official Action dated Apr. 5, 2006 in U.S. Appl. No. 10/377,258.
U.S. Official Action dated Apr. 10, 2006 in U.S. Appl. No. 10/179,810.
U.S. Official Action dated Apr. 17, 2006 in U.S. Appl. No. 10/179,438.
U.S. Final Official Action dated Apr. 17, 2006 in U.S. Appl. No. 10/184,190.
Menu Customizing, IBM Technical Disclosure Bulletin, vol. 34, No. 1, Jun. 1991, pp. 91-92 (4 pp. total).
Perry, Brad, et al., "Discovering Similar Resources by Content Park-Linking", Proceedings of the Sixth International Conference on Information and Knowledge Management, published by ACM Press 1997, pp. 317-324.
Schulz, Charles, "Writing Applications for Uniform Operation on a Mainframe or PC: A Metric Conversion Program", Lockheed Missles & Space Company, Inc., Sunnyvale, CA, May 1990, pp. 348-361.
Devanbue, P. et al., "Chime: customizable hyperlink insertion and maintenance engine for software engineering environments", Software Engineering, Publication date: 1999, ISBN: 1-58113-07400.

"Using Flyswat", http://www.flywsat.com/using.html, download date: Sep. 28, 1999, 1 pp.

"What is Flyswat", http://www.flyswat.com, download date: Sep. 28, 1999, 5 pp.

"Intelligent Text Processing: About", http://www.syntalex.co.uk/about/about.html, download date: Aug. 7, 1999, 1 pp.

"Intelligent Text Processing: Automatic Cross-Referencing", http://www.syntalex.co.uk/services/acrl.html, download date Aug. 7, 1999, 3 pp.

"Intelligent Text Processing: Case Study: Context", http://www.syntalex.co.uk/casestudies/context.html, download date: Aug. 7, 1999, 3 pp.

"Integrating with External Systems: iPlanet™ Unified Development Server", Sun Microsystems, Inc., Ver. 5.0, Aug. 2001, pp. 127-156.

Sperberg-McQueen, C.M. and Thompson, Henry, "XML Schema", W3C Architecture Domain, http://web.archive.org/web/20020802155904/http://www.w3.org/XML/Schema, 2000-2002, pp. 1-10.

Quin, Liam, "Extensible Markup Language (XML)", W3C Architecture Domain, http://web.archive.org/web/2002121962057/http://www.w3.org/XML/, 1996-2002, pp. 1-3.

Clark, James, and DeRose, Steve, "XML Path Language (XPath), Version 1.0", W3C, http://web.archive.org/web/2021010034434/http://www.w3.org/TR/xpath, 1999-2000, pp. 1-31.

"Microsoft BizTalk Server 2002—Using BizTalk Mapper", http://msdn.Microsoft.com/library/en-us/bts_2002/htm/lat_xmltools_map_intro_zkqb.asp..., Microsoft Corporation, 1999-2001, pp. 1-2.

"BizTalk Server 2002 Mapper User Interface", http://msdn.microsoft.com/library/en-us/bts_2002/htm/lat_xmltools_map_concept_codw..., Microsoft Corporation, 1999-2001, pp. 1.

"BizTalk Server 2002 Compiling Maps", http://msdn.microsoft.com/library/en-us/bts_2002/htm/lat_xmltools_map_concept_drgl.a..., Microsoft Corporation, 1999-2001, pp. 1.

"BizTalk Server 2002 Testing Maps", http://msdn.microsoft.com/library/en-us/bts_2002/htm/lat_xmltools_map_concept_fhhy.a..., Microsoft Corporation, 1999-2001, pp. 1-2.

"BizTalk Server 2002 View Links and Functoids By Using Grid Preview", http://msdn.microsoft.com/library/en-us/bts_2002/htm/lat_xmltools_map_check_fuwn.as..., Microsoft Corporation, 1999-2001, pp. 1.

"The StarOffice™ 6.0 Suite: New Features Guide", Sun Microsystems, V. 1.1, Jul. 2002, pp. 1-31.

"New Microsoft Office Family Application Taps Power of Industry-Standard XML", http://www.microsoft.com/presspass/press/2002/oct02/10-09officefamilypr.mspx, Microsoft Corporation, Oct. 2002-Feb. 2003, pp. 1-2.

"Q&A: How 'XDocs' Alters the Paradigm for Gathering Business-Critical Information", http://www.microsoft.com/presspass/press/2002/oct02/10-09officefamily.mspx, Microsoft Corporation, Oct. 2002-Feb. 2003, pp. 1-4.

"InfoPath: Microsoft Names New Product from Office Group", http://www.microsoft.com/presspass/press/2003/feb03/02-10infopath.mspx, Microsoft Corporation, Oct. 2002-Feb. 2003, pp. 1-4.

"Microsoft Unveils Visual Studio.NET Enterprise Tools", Microsoft Corporation, http://microsoft.com/presspass/press/2001/may01/05-21vseepr.mspx, May 2001, pp. 1-4.

"Microsoft Extends XML Web Services Support in .NET Enterprise Servers Through Visual Studio .NET", http://www.microsoft.com/presspass/press/2002/feb02/02-13servervspr.mspx, Microsoft Corporation, Feb. 2002, pp. 1-3.

"How to Use XSL to Transform Excel XML Spreadsheet for Server-Side Use", http://support.microsoft.com/default.aspx?scid=kb;en-us;278976, Microsoft Corporation, Aug. 2004, pp. 1-7.

Mueller, Jennifer M., "Work Smarter with Smart Tags", Journal of Accounting—Online, vol. 194, No. 5, Nov. 2002, http://www.aicpa.org/pubs/jofa/nov2002/Mueller.htm>, retrieved on Apr. 22, 2005.

M. Fernandez et al., "SilkRoute: trading between relations and XML", Computer Networks, vol. 33, No. 1-6, Jun. 2000, pp. 723-745.

V. Braganholo, "Updating Relational Databases Through XML Views", Technical Report, Sep. 2002, pp. 1-61.

G. Falquet et al., "Design and Analysis of Active Hypertext Views on Databases", Information Sciences Institute, Jan. 2002, pp. 1-24.

S. Ceri et al., "Deriving Production Rules for Incremental View Maintenance", Proceedings of the 17th International Conference on Very Large Data Bases, Sep. 1991, pp. 577-589.

A. Bonifati, "Active Behaviors within XML Document Management", EDBT Ph. D. Workshop, Mar. 2000, pp. 1-4.

"Integrated Development Enviorment (IDE)", http://web.archive.org/web/20020602032242/http:altova.com/products_ide.html, Jun. 2002, pp. 1-2.

"Altova markup your mind!" http://web.archive.org/web/20021204211721/http://altova.com/products_ide.html, Dec. 2002, pp. 1-3.

Arbortext, "Arbortext and Accessibilty", http://web.archive.org/web/20021219133536/www.arbortext.com/html/accessibility.html, Dec. 2002, pp. 1-5.

Arbortext, "XML Compliance, 100% Pure XML", http:web.archive.org/web/20021209185855/www.arbortext.com/html/xml_compliance, Dec. 2002, pp. 1-3.

Arbortext, "Schemas", http://web.archive.org/web/20021221023148/www.arbortext.com/html/schemas.html, Dec. 2002, pp. 1-3.

Arbortext, "Arbortext's Support for XSL-FO", http://web.archive.org/web/20021221021632/www.arbortext.com/html/xsl-fo.html. Dec. 2002, pp. 1-4.

Corel, "Corel XMetal4, Making XML Content Creation Easy", http://web.archive.org/web/20031118215158/www.corel.com/servlet/Satellite?pagename, Nov. 2003, pp. 1-2.

Corel, "Corel XMetal 4 and Interwoven TeamXML", http://web.archive.org/web/20030807211225/www.corel.com/futuretense_cs/ccurl/corel+xml+4+and+interwoven+teamxml.pdf , Aug. 2003, pp. 1-2.

Corel, "The Corel-XyEnterprise XML Solution", http://web.archive.org/web/20030807154355/www.corel.com/futuretense_cs/ccurl/corel+and+XY+enterprise+XML.+solution.pdf, Aug. 2003, pp. 1-2.

Brooks-Bilson, "Programming ColdFusion" [electronic resource] 2001, Safari Tech Books Online, 1st Edition, 25 pp.

Wilker, John, "ColdFusion MX Adds J2EE, XML, and Web Services Compatibility", Aug. 9, 2002, http://builder.com.com/5102-6387-104585.html, 3 pp.

Homer, Alex et al., Professional Active Services Pages, 1997, Wrox Press Ltd., Section"Client-Side Scripting and Components", subsection "Choosing Your Applets, and Controls", 16 pp.

Flanagan, D., "JavaScript—The Definitive Guide, Fourth Edition", Jan. 2002, O'Reilly, 12 pp.

Brockschmidt, K., "Inside OLE, Second Edition", 1995, Microsoft Press, p. 169.

Toth, V., "Visual C++ 4 Unleashed", 1996, Sams Publishing, p. 174.

Sriram, V., "ComponentXchange: An E-Exchange for Software Components", Master Thesis, CitSeer, May 2001, pp. i-v, 1-77.

Bosak, "XML: The Universal Publishing Format", SGML/XML Europe '98, May 1998, pp. A1-C17.

Kristensen, "Template Resolution in XML/HTML", Computer Networks and ISDN Systems, vol. 30, 1998, pp. 239-249.

Fan et al., "FormPlus: A Form Authoring Toolkit", Proceedings of the Fourteenth Annual Computer Software and Applications Conference, Oct. 31, 1990-Nov. 2, 1990, pp. 255-260.

Boone, "Concept Features in Re: Agent, An Intelligent Email Agent", Proceedings of the 2nd International Conference on Autonomous Agents, May 9-13, 1998, pp. 141-148.

Takkinen et al., "CAFÉ: A Conceptual Model for Managing Information in Electronic Mail", Proceedings of the Annual Hawaii International Conference on System Sciences, 1998, pp. 44-53.

"Smart Tags: Dumb Technology?", webreference.com, Online, Aug. 29, 2001, http://www.webreference.com/xml/column30/3.html, 3 pp.

"Being 'Smart' with Smart Tags in Office XP", Create for Mississippi, Aug. 2001, http://www.create.cett.msstate.edu/create/howto/smart_tags.pdf, 7 pp.

Harold, E.R., "XML: Extensible Markup Language", IDG Books Worldwide, Books 24x7.com printout, 1998, pp. 1-11.

Marais, Hannes, "Supporting Cooperative and Personal Surfing With a Desktop Assistant", 1997, ACM Press, pp. 129-138.

U.S. Appl. No. 10/164,960, filed Jun. 6, 2002, entitled "Providing Contextually Sensitive Actions and Help Content in Computer-Generated Documents".

U.S. Appl. No. 10/164,260, filed Jun. 5, 2002, entitled "Mechanism for Downloading Software Components from a Remote Source for Use by a Local Software Application".

U.S. Appl. No. 10/731,899, filed Dec. 9, 2003, entitled "Mechanism for Downloading Components Associated with XML Documents and Smart Documents".

U.S. Appl. No. 10/366,141, filed Feb. 13, 2003, entitled "Linking Elements of a Document to Corresponding Fields, Queries and/or Procedures in a Database".

U.S. Appl. No. 10/377,258, filed Feb. 28, 2003, entitled "Method and System for Enhancing Paste Functionality of a Computer Software Application".

U.S. Appl. No. 10/608,267, filed Jun. 27, 2003, entitled "Leveraging Markup Language Data for Semantically Labeling Text Strings and Data and for Providing Actions Based on Semantically Labeled Text Strings and Data".

U.S. Appl. No. 10/780,376, filed Feb. 17, 2004, entitled "Methods and Systems for Providing Automatic Actions on Recognized Text Strings in a Computer-Generated Document".

U.S. Appl. No. 10/184,190, filed Jun. 27, 2002, entitled "System and Method for Providing Namespace Related Information".

U.S. Official Action dated Dec. 29, 2003 in U.S. Appl. No. 09/588,411.

U.S. Official Action dated Feb. 12, 2004 in U.S. Appl. No. 10/154,630.

U.S. Official Action dated Mar. 29, 2004 in U.S. Appl. No. 09/906,552.

U.S. Official Action dated Jun. 14, 2004 in U.S. Appl. No. 09/588,411.

U.S. Official Action dated Jun. 18, 2004 in U.S. Appl. No. 09/818,157.

U.S. Official Action dated Jul. 15, 2004 in U.S. Appl. No. 09/906,467.

U.S. Official Action dated Aug. 20, 2004 in U.S. Appl. No. 09/841,266.

U.S. Official Action dated Sep. 29, 2004 in U.S. Appl. No. 09/907,418.

U.S. Official Action dated Oct. 6, 2004 in U.S. Appl. No. 09/818,157.

U.S. Official Action dated Nov. 2, 2004 in U.S. Appl. No. 10/178,680.

U.S. Official Action dated Dec. 8, 2004 in U.S. Appl. No. 09/588,411.

U.S. Official Action dated Jan. 25, 2005 in U.S. Appl. No. 09/906,552.

U.S. Official Action dated Jan. 26, 2005 in U.S. Appl. No. 10/154,630.

U.S. Official Action dated Mar. 1, 2005 in U.S. Appl. No. 09/818,157.

U.S. Official Action dated Mar. 24, 2005 in U.S. Appl. No. 10/141,712.

U.S. Official Action dated Apr. 8, 2005 in U.S. Appl. No. 10/164,960.

U.S. Official Action dated Apr. 19, 2005 in U.S. Appl. No. 09/841,266.

U.S. Official Action dated May 5, 2005 in U.S. Appl. No. 09/906,467.

U.S. Official Action dated May 6, 2005 in U.S. Appl. No. 09/907,418.

U.S. Official Action dated May 20, 2005 in U.S. Appl. No. 10/184,298.

U.S. Official Action dated Jun. 3, 2005 in U.S. Appl. No. 10/154,630.

U.S. Official Action dated Jun. 6, 2005 in U.S. Appl. No. 10/164,260.

U.S. Official Action dated Jun. 24, 2005 in U.S. Appl. No. 10/140,544.

U.S. Official Action dated Jul. 25, 2005 in U.S. Appl. No. 10/179,438.

U.S. Official Action dated Sep. 2, 2005 in U.S. Appl. No. 10/366,141.

U.S. Official Action dated Oct. 4, 2005 in U.S. Appl. No. 10/183,317.

U.S. Official Action dated Oct. 5, 2005 in U.S. Appl. No. 10/179,810.

U.S. Official Action dated Oct. 20, 2005 in U.S. Appl. No. 09/906,552.

U.S. Official Action dated Nov. 2, 2005 in U.S. Appl. No. 10/184,190.

U.S. Official Action dated Nov. 10, 2005 in U.S. Appl. No. 10/164,260.

U.S. Official Action dated Nov. 22, 2005 in U.S. Appl. No. 10/141,712.

U.S. Official Action dated Dec. 5, 2005 in U.S. Appl. No. 09/907,418.

U.S. Official Action dated Dec. 14, 2005 in U.S. Appl. No. 10/608,267.

U.S. Official Action dated Dec. 15, 2005 in U.S. Appl. No. 10/155,680.

U.S. Official Action dated Jan. 11, 2006 in U.S. Appl. No. 09/841,266.

U.S. Official Action dated Jan. 17, 2006 in U.S. Appl. No. 10/140,544.

U.S. Official Action dated Feb. 2, 2006 in U.S. Appl. No. 09/906,467.

U.S. Official Action dated Feb. 16, 2006 in U.S. Appl. No. 10/184,298.

U.S. Official Action dated Feb. 24, 2006 in U.S. Appl. No. 10/154,630.

U.S. Official Action dated May 14, 2007 cited in U.S. Appl. No. 09/906,552.

U.S. Final Official Action dated May 18, 2007 cited in U.S. Appl. No. 10/155,680.

U.S. Official Action dated May 30, 2007 cited in U.S. Appl. No. 09/906,467.

U.S. Final Official Action dated Jun. 15, 2007 cited in U.S. Appl. No. 10/731,899.

Blaheta et al., "Assigning Function Tags to Parsed Text," Morgan Kaufmann Publishers Inc., 2000, pp. 234-240.

European Communication dated Feb. 16, 2007 cited in European Application No. 04 003 683.2-2211.

Anonymous, "Adding Data from Other Sources in PowerPoint 2002," Jul. 2002, Internet article, XP-002420700, A Professional Approach Series the E-Zine Approach, http://www.glencoe.com/ps/computered/pas/article.php4?articleId-437, 8 pgs.

Rice, F.C., "Transform XML Files with XSLT When Importing into Microsoft Excel 2002," Jul. 2001, Internet article, XP-002420701, http://msdn2.microsoft.com/en-us/library/aa140055(office.10.d=printer).aspx, 9 pgs.

Johnson, L., "What's So Special About Paste Special?", Jun. 2002, Internet article, XP-002420702, http://pubs.logicalexpressions.com/Pub0009/LPMArticle.asp?ID=40, 5 pgs.

Anonymous, "Moving and Copying Text Tutorial," Aug. 17, 2001, Internet Article, XP-002307566, http://tutorials.findtutorials.com/read/category/102/id/342/p/3, 4 pgs.

U.S. Official Action dated Mar. 9, 2007 cited in U.S. Appl. No. 10/426,446.

U.S. Official Action dated Mar. 12, 2007 cited in U.S. Appl. No. 10/141,712.

U.S. Official Action dated Apr. 10, 2007 cited in U.S. Appl. No. 09/907,418.

European Communication dated Dec. 11, 2006 in EP 03 012 830.0-2211.

Singapore Search Report/Written Opinion dated Jan. 26, 2007 in SG 200500214-2.

U.S. Official Action dated Feb. 6, 2007 cited in U.S. Appl. No. 09/588,411.

U.S. Official Action dated Feb. 7, 2007 cited in U.S. Appl. No. 10/179,438.

U.S. Official Action dated Feb. 21, 2007 cited in U.S. Appl. No. 10/366,141.

European Communication dated Nov. 17, 2006 in EP 03 011 851.7-2211.

U.S. Official Action dated Dec. 20, 2006 in U.S. Appl. No. 10/154,630.

U.S. Final Official Action dated Dec. 26, 2006 in U.S. Appl. No. 10/179,810.

U.S. Official Action dated Jan. 5, 2007 in U.S. Appl. No. 10/183,717.

U.S. Official Action dated Jan. 11, 2007 in U.S. Appl. No. 10/184,190.

U.S. Official Action dated Jan. 25, 2007 in U.S. Appl. No. 10/608,267.

European Communication dated Sep. 25, 2006 in EP 03 01 4181.

World Wide Web Consortium, "Document Object Model (DOM) Level 2 Events Specification, Version 1.0", http://www.w3.org/TR/2000/REC-DOM-Level-2-Events-20001113/DOM2-Events.pdf, Nov. 2000, 50 pp.

World Wide Web Consortium, "Document Object Model (DOM) Level 2 Core Specification, Version 1.0", http://www.w3.org/TR/2000/REC-DOM-Level-2-Core-20001113/DOM2-Core.pdf, Nov. 2000, 107 pp.

European Communication dated Nov. 9, 2006 in EP 03010292.5.

"Word 2002 Add in: measurement Converter Smart Tag", http://www.microsoft.com/downloads/details.aspx?FamilyID=f67fc42c-5f41-4c3f-9d5a-71354471dc32&DisplayLang=en, retrieved on Nov. 9, 2006, 2 pgs.

"Microsoft Measurement Converter Smart Tag—Chinese Version", http://www.jiyang.gov/cn/laiying/My%20Pictures/%E8%B4%E5%BA%86%E8%BE%89/office2003/FILES/PFILES/COMMON/MSSHARED/SMARTTAG/CMEASURE/1033/CHMCABT.HTM, retrieved on Nov. 7, 2006, 2 pgs.

U.S. Office Action dated Nov. 9, 2006 cited in U.S. Appl. No. 10/184,298.

U.S. Office Action dated Nov. 15, 2006 cited in U.S. Appl. No. 10/179,438.

U.S. Final Official Action dated Oct. 19, 2006 cited in U.S. Appl. No. 09/906,467.

U.S. Official Action dated Sep. 28, 2006 cited in U.S. Appl. No. 10/608,267.

U.S. Final Official Action dated Oct. 5, 2006 cited in U.S. Appl. No. 09/841,266.

U.S. Official Action dated Oct. 6, 2006 cited in U.S. Appl. No. 10/140,544.

European Communication dated Apr. 19, 2006 in EP 05 000 506.5-1527.

Malaysian Search Report dated Aug. 2, 2007 cited in Malaysian Application No. PI 20040265.

U.S. Office Action dated Sep. 27, 2007 cited in U.S. Appl. No. 10/608,267.

U.S. Final Office Action dated Jul. 26, 2007 cited in U.S. Appl. No. 10/164,960.

U.S. Office Action dated Aug. 10, 2007 cited in U.S. Appl. No. 10/179,810.

U.S. Office Action dated Sep. 10, 2007 cited in U.S. Appl. No. 10/179,439.

U.S. Office Action dated Jun. 28, 2007 cited in U.S. Appl. No. 09/841,266.

U.S. Final Office Action dated Jul. 12, 2007 cited in U.S. Appl. No. 10/184,298.

U.S. Office Action dated Jul. 13, 2007 cited in U.S. Appl. No. 10/154,630.

U.S. Office Action dated Jan. 25, 2008 cited in U.S. Appl. No. 10/608,267.

Russian Official Action dated Jan. 11, 2008 cited in Russian Application No. 2004105880/09(006292).

V. Doroth et al., "Modern Computer Vocabulary," St. Petersburg, BHV-Peterburg, 2001, p. 465 (with English language translation).

European Communication dated Sep. 25, 2007 cited in European Application No. 03 014 181.6-1243.

Japanese Official Action dated Oct. 19, 2007 cited in Japanese Application No. 2003-128417.

Rubin, Charles, "Microsoft Word 2000 Official Manual," First Edition, Nikkei BP Soft Press, Inc., Aug. 2, 1999, pp. 215-217.

U.S. Final Office Action dated Dec. 7, 2007 cited in U.S. Appl. No. 10/426,446.

U.S. Office Action dated Dec. 26, 2007 cited in U.S. Appl. No. 10/377,258.

U.S. Final Office Action dated Jan. 7, 2008 cited in U.S. Appl. No. 10/179,438.

U.S. Final Office Action dated Jan. 9, 2008 cited in U.S. Appl. No. 09/906,467.

David D. Lewis et al., "A Sequential Algorithm for Training Text Classifiers," Spring-Verlag New York, Inc., 1994, pp. 1-10.

U.S. Official Action mailed Apr. 1, 2008 cited in U.S. Appl. No. 09/907,418.

U.S. Official Action mailed Apr. 4, 2008 cited in U.S. Appl. No. 10/155,680.

U.S. Official Action mailed Apr. 29, 2008 cited in U.S. Appl. No. 09/588,411.

U.S. Final Official Action mailed Apr. 29, 2008 cited in U.S. Appl. No. 10/179,810.

U.S. Official Action mailed May 1, 2008 cited in U.S. Appl. No. 10/183,317.

European Communication Summons to Attend Oral Proceedings dated Mar. 4, 2008 in EP 05 000 506.5-1527.

European Communication Summons to Attend Oral Proceedings dated Mar. 10, 2008 in EP 03 01 0292.5-1527.

U.S. Office Action dated Feb. 8, 2008 cited in U.S. Appl. No. 10/141,712.

U.S. Office Action dated Feb. 15, 2008 cited in U.S. Appl. No. 10/731,899.

U.S. Final Office Action dated Feb. 20, 2008 cited in U.S. Appl. No. 10/154,630.

Singapore Examination Reported (conducted by Austrian Patent Office) dated Jan. 25, 2008 cited in SG Application No. 200500214-2.

Chinese Official Action dated Dec. 28, 2007 cited in Application No. 200410005390.8.

Chinese Official Action dated Jan. 4, 2008 cited in Application No. 200510009487.0.

Wei Ying-bin et al., "A New Technology ColdFusion of Realizing Dynamic Webpage," 2000, 6 pgs. (English language translation, pp. 1-6).

European Examination Report dated Mar. 4, 2006 cited in EP Application No. 02 014 717.9-1527.

European Examination Report dated Mar. 4, 2006 cited in EP Application No. 03 012 432.5-1527.

Russian Official Action dated Oct. 11, 2008 cited in Russian Application No. 2003118722.

Pershikov, V.I., "Explanatory Dictionary in Informatics," Finances and Statistics, Moscow, 1991 (in Russian with translated sections) 5 pgs.

U.S. Final Office Action dated Dec. 18, 2007 cited in U.S. Appl. No. 10/366,141.

"The Spatial Smart Tag", Geomatic Technologies, Mar. 10, 2005, 2 pp.

Harmon, D., "Microsoft MapPoint 2002", Geoworld Quick-Take Reviews, Aug. 2001, 3 pp.

Irie R. et al., "Resources for Place Name Analysis", May 28, 2004, 4 pp.

Rajabifard, A. et al., "Creating an Enabling Platform for the Delivery of Spatial Information", Spatial Sciences Institute Biennial Conference, Sep. 12, 2005, 10 pp.

Camarda, B., Special Editing Using® Microsoft® Office Word 2003, Que, Dec. 12, 2003, pp. 1-5.

Ivens, K., Office XP Smart Tags, Microsoft, Mar. 6, 2002, pp. 1-4.

Frye, C., Microsoft Office Systems: Step by Step, Microsoft Press, 2003 Edition, Sep. 3, 2003, pp. 1-6.

U.S. Official Action mailed Sep. 8, 2006 in U.S. Appl. No. 10/948,948.

U.S. Official Action mailed Feb. 15, 2007 in U.S. Appl. No. 10/948,948.

U.S. Official Action mailed Oct. 18, 2007 in U.S. Appl. No. 10/948,948.

U.S. Official Action mailed Mar. 20, 2008 in U.S. Appl. No. 10/948,948.

U.S. Official Action mailed Oct. 16, 2008 in U.S. Appl. No. 10/948,948.

U.S. Official Action mailed Oct. 16, 2008 in U.S. Appl. No. 10/154,630.

European Search Report dated Dec. 12, 2006 in European Application No. 05 105 000.3-1527.

European Examination Report dated Oct. 9, 2007 in European Application No. 05 105 000.3-1527.

European Preliminary Opinion dated Aug. 27, 2008 cited in European Application No. 04002224.6-1527 / 1447754.

Chinese Official Action dated Dec. 7, 2007 in Chinese Application No. 200510088529.4.

Chinese Second Official Action dated Aug. 15, 2008 in Chinese Application No. 200510088529.4.

Chilean Second Office Action cited in Chilean Application No. 67-2005 (date unknown).

Malaysian Official Action dated Aug. 29, 2008 cited in Malaysian Application No. PI 20031902.
Polish Official Action dated Aug. 27, 2008 in Polish Application No. P360520.
European Communication Minutes of Oral Proceedings and Decision dated Sep. 15, 2008 in European Application No. 05 000 506.5-1527.
Polish Second Official Action dated Oct. 28, 2008 in Polish Application No. P36553.
Rubin, C., "Microsoft Word 2000 Official Manual", First Edition, Nikkei BP Soft Press, Inc., Aug. 2, 1999, pp. 215-217.
U.S. Office Action dated May 27, 2008 cited in U.S. Appl. No. 09/906,552.
U.S. Examiner's Answer BPAI dated Jun. 5, 2008 cited in U.S. Appl. No. 10/184,298.
U.S. Office Action dated Jun. 12, 2008 cited in U.S. Appl. No. 10/426,446.
U.S. Office Action dated Jun. 13, 2008 cited in U.S. Appl. No. 10/780,376.
U.S. Final Office Action dated Jun. 27, 2008 cited in U.S. Appl. No. 10/377,258.
M. Stowe, "XML in Excel and the Spreadsheet Component", Microsoft Corporation, Aug. 2001, 6 pgs.
C. Heinemann, "Cross-Reference your XML Data", Microsoft Corporation, Dec. 7, 1998, 6 pgs.
D. Obasanjo, "XML_Namespaces and How They Affect Xpath and XSLT", Microsoft Corporation, May 20, 2002, 19 pgs.
European Communication Summons to Attend Oral Proceedings dated May 7, 2008 cited in European Application No. 04002224.6.
Russian Official Action dated Mar. 13, 2008 cited in Russian Application No. 2004104096/09(004398).
Japanese Official Action dated Mar. 28, 2008 cited in Japanese Application No. 2003-178497.
Pixley, "Document Object Model (DOM) Level 2 Events Specification Version 1.0", World Wide Web Consortium, Nov. 13, 2000, www.w3.org/TR/2000/REC-DOM-Level-2-Events-20001113/DOM2-Events.pdf.
European Communication dated Jun. 3, 2008 cited in European Application No. 03 011 851.7-2211.
Japanese Official Action dated Apr. 18, 2008 cited in Japanese Application No. 2003-128417.
Australian First Official Action dated Oct. 21, 2008 cited in Application No. 2003204800.
U.S. Office Action dated Dec. 23, 2008 cited in U.S. Appl. No. 10/179,810.
U.S. Office Action dated Jan. 5, 2009 cited in U.S. Appl. No. 10/141,712.
European Statement regarding Grounds of Appeal dated Jan. 13, 2009 cited in Application No. 04 002 224.6.
Shiroiwa, K., "iMac&iBook, Must-see for User, Full of Recommended Setting Methods and Specially Selected Tips, Mastering Mac OS9", MacPeople, ASCII Corporation, Japan, Dec. 3, 1999, vol. 5, No. 24, p. 50 (in Japanese—no translation yet).
(Previously cited) Koyaku, H., "What is Brought to SQL Server 2000 by XML, Part 1: Function of XML Provided by SQL Server 2000", Enterprise Servers World, vol. 3, No. 12, IDG Japan, Inc., Dec. 1, 2000, pp. 42-53 (with English language translation).
U.S. Final Office Action dated Jan. 22, 2009 cited in U.S. Appl. No. 10/366,141.
U.S. Office Action dated Feb. 4, 2009 cited in U.S. Appl. No. 10/377,258.
U.S. Final Office Action dated Mar. 4, 2009 cited in U.S. Appl. No. 10/780,376.
European Summons to Attend Oral Proceedings dated Feb. 26, 2009 cited in European Application No. 03012830.0-2211.
European Communication dated Mar. 18, 2009 cited in European Application No. 04003683.2-2211.
European Summons to Attend Oral Proceedings dated Mar. 20, 2009 cited in European Application No. 03012830.0.
Japanese Official Action dated Feb. 6, 2009 cited in Japanese Application No. 2003-180218.
Japanese Official Action dated Feb. 13, 2009 cited in Japanese Application No. 2003-162911.
Japanese Official Action dated Feb. 24, 2009 cited in Japanese Application No. 2003-161338.
Japanese Official Action dated Mar. 6, 2009 cited in Japanese Application No. 2004-042140.
Mexican Official Action dated Feb. 11, 2009 cited in Application No. PA/a/2003/005451.
Chinese Final Rejection dated Mar. 13, 2009 cited in Application No. 03145242.6.
Japanese Final Rejection dated Mar. 17, 2009 cited in Application No. 2004-037158.
Japanese Final Rejection dated Apr. 3, 2009 cited in Application No. 2002-207514.
C. Goldfarb, XML Handbook, 1$^{st}$ Ed., Pearson Education, Japan, May 10, 1999, pp. 246-254 (no English translation).
S. Tanaka, "Verifying the XML Schema Definition," XML Magazine, Shoeisha Co., Ltd., vol. 10, No. 3, Jul. 1, 2000, pp. 135-155 (no English translation).
U.S. Office Action dated Apr. 20, 2009 cited in U.S. Appl. No. 10/426,446.
U.S. Office Action dated Apr. 27, 2009 cited in U.S. Appl. No. 10/154,630.
Australian First Examiner's Report dated Sep. 15, 2008 in Application No. 2003204379.
Japanese Final Official Action dated Nov. 25, 2008 cited in Application No. 2002-207514.
Hara, T. et al., "Inside Microsoft.NET-Complete Explanation, 'What Microsoft Aims For'", msdn magazine, No. 6, pp. 20-35, ASCII, Japan, Sep. 18, 2000, 19 pp.
Japanese Office Action dated Oct. 10, 2008 cited in Application No. 2004-037158.
Koyaku, H., "What is Brought to SQL Server 2000 by XML, Part 1: Function of XML Provided by SQL Server 2000", Enterprise Servers World, vol. 3, No. 12, IDG Japan, Inc., Dec. 1, 2000, pp. 42-53.
Chinese Office Action dated Oct. 17, 2008 cited in Application No. 03145242.6.
U.S. Final Office Action dated Dec. 8, 2008 cited in U.S. Appl. No. 10/183,317.
*Microsoft Computer Dictionary*, Microsoft, Microsoft Press, Fifth Edition, p. 409, Apr. 9, 2004.
Hewkin, "Smart Tags—the Distributed-Memory Resolution", IEE Review, Jun. 22, 1989, pp. 203-206.
Measuring Units Conversion Table—http://web.archie.org- 1997 Internet French Property, pp. 1-4.
Driza, Scott, "Learn Word 2000 VBA Document Automation", Wordware Publishing Inc., 2001, 6 pp.
Cornell, Paul, "Developing Smart Tag DLLs", MSDN Library, http://msdn.microsoft.com/library/default.asp?url=/library/en-us/dnsmarttag/html/odc_smarttags.asp, Apr. 2001, pp. 8.
IBM Technical Disclosure Bulletin, "National Language Support Enhancement for Culture-Specific Options", Nov. 1, 1993, vol. 36, Issue 11, pp. 629-638.
Towers, J. Tarin, Visual Quickstart Guide: Dreamweaver 2 for Windows and Macintosh, 1999, Peachpit Press, pp. 150-151.
U.S. Appl. No. 10/183,317, filed Jun. 25, 2002, entitled "System and Method for Issuing a Message to a Program", Inventors: Sawicki et al.
Polish Official Letter dated Jun. 24, 2008 cited Polish Application No. P 365553.
U.S. Final Office Action dated Jul. 29, 2008 cited in U.S. Appl. No. 10/141,712.
"XML Schema Part 2: Datatypes," W3C, May 2, 2001, http://www.w3.org/TR/2001/REC-xmlschema-2-20010502/, pp. 1-146 (separated into 2 documents A & B).
U.S. Office Action dated Aug. 1, 2008 cited in U.S. Appl. No. 10/366,141.
Ghamrawi et al., "Collective Multi-Label Classification," ACM, 2005, pp. 195-200.
Polish Official Action dated Jul. 21, 2008 cited in Polish Application No. P 364854.
Japanese Office Action dated Jul. 18, 2008 cited in Japanese Application No. 2002-207514.

U.S. Appl. No. 11/924,856, filed Oct. 26, 2007 entitled "Providing Contextually Sensitive Tools and Help Content in Computer-Generated Documents".

U.S. Office Action dated Oct. 9, 2007 cited in U.S. Appl. No. 10/183,317.

U.S. Final Office Action dated Oct. 16, 2007 cited in U.S. Appl. No. 09/907,418.

U.S. Office Action dated Oct. 17, 2007 cited in U.S. Appl. No. 10/155,680.

U.S. Final Office Action dated Oct. 19, 2007 cited in U.S. Appl. No. 10/184,190.

U.S. Final Office Action dated Oct. 19, 2007 cited in U.S. Appl. No. 09/588,411.

U.S. Final Office Action dated Oct. 19, 2007 cited in U.S. Appl. No. 10/141,712.

U.S. Final Office Action dated Oct. 30, 2007 cited in U.S. Appl. No. 09/906,552.

U.S. Official Action dated Sep. 7, 2006 cited in U.S. Appl. No. 10/155,680.

Japanese Official Action dated May 26, 2009 cited in Application No. 2005-039754.

Chinese Decision on Rejection dated Jul. 3, 2009 cited in Application No. 03143003.1.

European Summons to Attend Oral Proceedings dated Aug. 5, 2009 cited in Application No. 03003931.7.

Polish Official Notice dated Aug. 25, 2009 cited in Application No. P.365553/DP.

Australian Official Action dated Sep. 11, 2009 cited in Application No. 2003204478.

Norwegian Official Action dated Aug. 24, 2009 cited in Application No. 2003 2550.

Polish Official Notice dated Sep. 22, 2009 cited in Application No. P. 364854/DP.

Polish Official Notice dated Sep. 23, 2009 cited in Application No. P. 360520/DP.

Korean Official Action dated Sep. 30, 2009 cited in Application No. 10-2003-40988.

Japanese Official Notice of Final Rejection dated Oct. 2, 2009 cited in Application No. 2003-162911.

U.S. Office Action dated Oct. 22, 2009 cited in U.S. Appl. No. 10/377,258.

Japanese Final Office Action dated Oct. 27, 2009 cited in Application No. 2003-161338.

Malaysian Examination Report dated Nov. 30, 2009 cited in Application No. PI 20040559.

Australian Third Official Action dated Dec. 23, 2009 cited in Application No. 2003204478.

Russian Official Action dated Jun. 21, 2009 cited in Application No. 2005104223/09(005505).

D. Richter, "Windows for professionals" (Win32 API programming for Windows NT 3.5 and Windows 95, translation from English, Moscow: Russian Edition, 1995, ISBN 5-7502-0010-8, pp. 26, 31, 215.

U.S. Final Office Action dated Nov. 30, 2009 cited in U.S. Appl. No. 10/179,810.

Glover et al., "Inferring hierarchical Descriptions," ACM, 2002, pp. 507-514.

Australian First Official Action Report dated Jan. 18, 2009 cited in Application No. 2004200459.

* cited by examiner

METHOD AND SYSTEM FOR APPLYING INPUT MODE BIAS

TECHNICAL FIELD

The invention generally relates to software program modules, and even more particularly, relates to using grammars to apply input mode bias to portions of an electronic document, including fields, and using the same grammars to apply semantic categories to strings in the document.

BACKGROUND

Computer software is becoming more and more accessible to receiving inputs from many different input methods such as through speech recognition, handwriting recognition, and East Asian input method editors, just to name a few. However, these stochastic input methods sometimes are less than reliable. For example, if speech recognition software is unaware of the particular type of input required in a particular field, then it may be difficult for it to understand what the user is trying to say. For example, it may be difficult to enter a phone number due to the speech recognition software being unaware of the particular type of input required.

Solutions have been developed that constrain input so that authors of text entry controls may set a property on a field so that an input method editor will recognize the bit and adjust the language model that the input method editor uses. Constraining input of a field, constraining input of part or all of a document, etc. may be referred to as mode bias. However, there are some drawbacks to these solutions. These solutions are limited to a fixed list of categories that may be indicated by the bit. Thus, there is an inflexible hard-coded list of ways to constrain input. A developer must select from the fixed list of categories and is not allowed to define new mode bias settings that may be useful.

Another problem with the current solution of using a fixed list of categories is that the response to these categories is not consistent between different input methods. A user expects different input methods to react similarly for the same input field. However, prior art solutions allow input methods to define their own response to particular categories of text entry controls. For example, a speech recognizer and a handwriting recognizer may handle a phone number entirely differently.

Thus, there is a need for a method for providing mode bias that is flexible in allowing developers to define what forms of input are acceptable for a particular field. There is still a further need for a method for providing mode bias that is consistent across different input methods.

SUMMARY OF THE INVENTION

The present invention meets the above-described needs by providing a method and system for applying input mode bias to input fields (and other regions) of an electronic document. A schema is applied to an input field of an electronic document and the schema is associated with a grammar that defines the set of acceptable strings that may be input into the input field. When text is input into the input field, the schema is determined and the associated grammar is determined. The grammar is then sent to the input method. Based on the grammar, the input method may determine what text the user is trying to enter. The grammar may also be used to apply semantic categories to text input into a document. After the text is entered it is compared to a grammar. If the entered text matches the form of the grammar, then the schema is applied to the text as a semantic category.

Typically, the schema names are stored in a schema database and the grammars are stored in a grammar database. The schema names may also be stored with other properties such as locale and language and a pointer to the associated grammar. Thus, when a user places the insertion point in an input field with mode bias applied, then the schema name and other properties are sent to the schema database for a look-up of the appropriate grammar. Based on the schema name (and other properties), the grammar (or a pointer to the grammar) is sent to the input method. The input method will then use the grammar to determine what the user is trying to enter into the input field. The input method may also provide suggestions or error messages if the user attempts to enter text that does not conform to the grammar.

Because the schema database and grammar database are outside of the control of the input methods, the present invention improves upon the prior art problem that input methods would handle mode bias differently. Using the present invention, each input method receives the same grammar and should handle it similarly whether the input method is a speech recognition engine, handwriting recognition engine, etc. The present invention is also flexible because new schemas and grammars may be defined and implemented by system administrators to provide custom mode bias that may be needed within an organization. In addition to providing mode bias, the grammars may be used to recognize semantic categories in a document.

That the invention improves over the drawbacks of the prior art and accomplishes the advantages described above will become apparent from the following detailed description of the exemplary embodiments and the appended drawings and claims.

DETAILED DESCRIPTION OF EMBODIMENTS OF THE INVENTION

Figure 1:
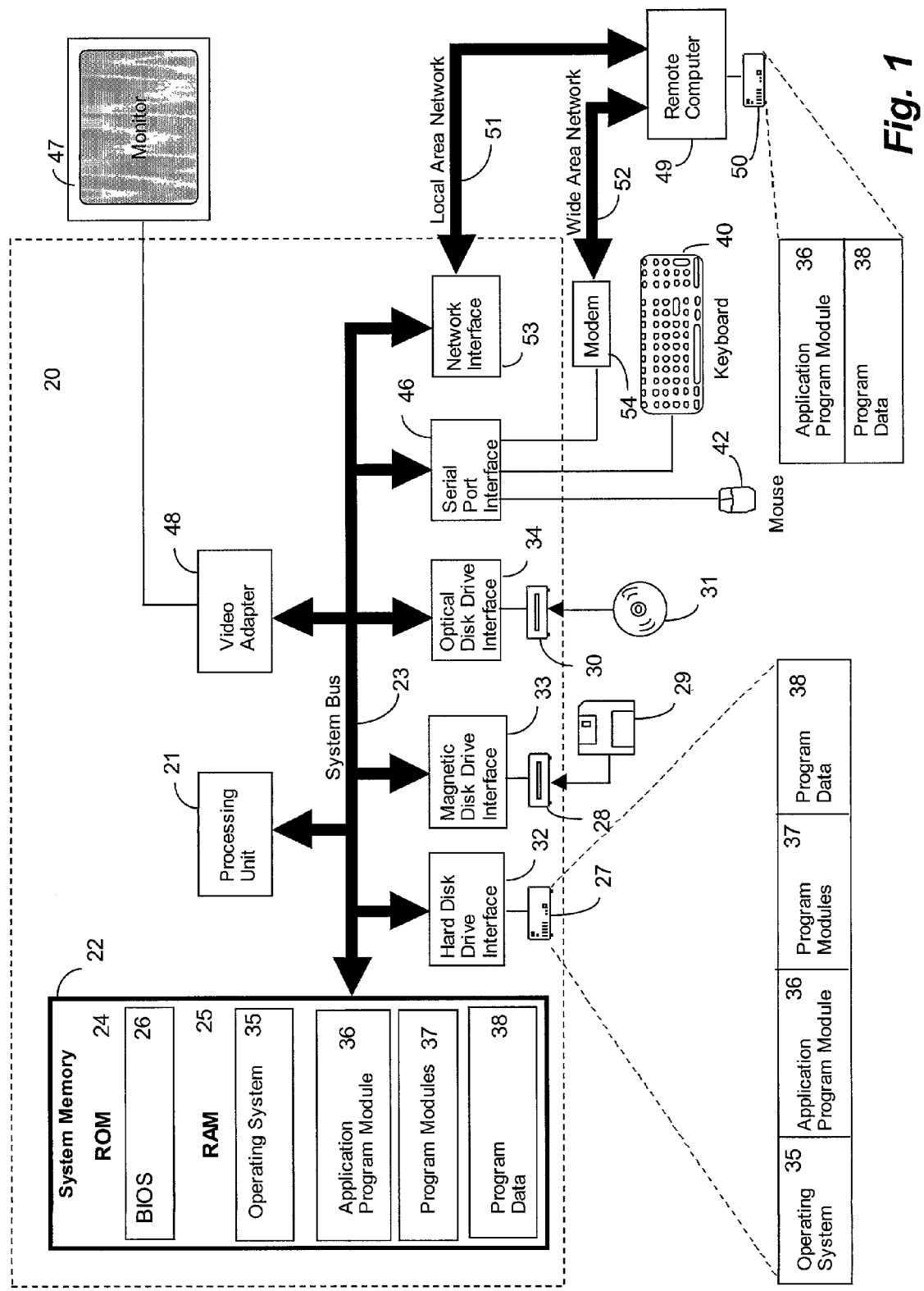
FIG. 1 is a block diagram of a computer that provides the exemplary operating environment for the present invention.

The present invention is directed toward a method and system for applying input mode bias. A schema is applied to an input field of an electronic document. The schema is the name of the type of input that should be input into the input field. As an example, the schema may be a telephone number schema. Associated with the schema is a grammar that defines the set of acceptable strings that may be input into the input field. For example, the grammar associated with the telephone number schema may define the input as being of the form (XXX) XXX-XXXX, where X represents a digit from 0-9.

Having briefly described an embodiment of the present invention, an exemplary operating environment for the present invention is described below.

Exemplary Operating Environment

Referring now to the drawings, in which like numerals represent like elements throughout the several figures, aspects of the present invention and the exemplary operating environment will be described.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22 and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, a word processor program module 37 (or other type of program module), program data 38, and other program modules (not shown).

A user may enter commands and information into the personal computer 20 through a keyboard 40 and pointing device, such as a mouse 42. Other input devices (not shown) may include a microphone, joystick, game pad, satellite dish, scanner, stylus, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Applying Input Mode Bias

Stochastic input methods are being used more frequently today than ever before. For some time stochastic input mechanisms have been used in East Asia in the form of Input Method Editors (IMEs). Recently, speech and handwriting input mechanisms have become more common. Unlike typing (outside of East Asia) where the user is able to easily type whatever he chooses, stochastic input methods by their nature presuppose that the user is trying to enter more common words and phrases. This presupposition typically works well when the user intends to enter common words and phrases. However, it can make it difficult to enter certain types of less common text. This can be particularly frustrating when inputting text into a form where there are constraints placed on what sort of information should be entered and the input mechanism doesn't adhere to these constraints. For example, it makes little sense to enter anything other than digits into a phone number field in contact management software, but speech and handwriting recognizers are rarely cognizant of this sort of constraint. In one embodiment, the present invention solves this problem with a mechanism for controlling mode bias of input controls, or input fields.

In one embodiment, the present invention may be used to define an XML schema associated with an input control. The schema may be associated with a grammar. A grammar is a definition of appropriate input (e.g. acceptable strings) for the input control. In one embodiment, the grammar may be a context free grammar, statistical language model, a list of possible inputs, etc.

The grammar is used to constrain the user's input so that the user completes an input field properly. For example, an input control may specify that it accepts part numbers by attaching <schemas-microsoft-com#partnumber> to the control. The schema microsoft-com#partnumber may be associated with a grammar that specifies that this specific sort of part number comprises a digit from 0 to 9 followed by a letter from a-z. In the example described above, the grammar is used to constrain the user's input to match the form of a part number. If the user enters something other than a part number, an error message or a suggestion may be presented to the user.

In other embodiments, the grammar may be used by different input methods to correctly identify the user's input. For example, a user of a speech recognition engine may say "four". Using the present invention, the speech recognition input method editor may determine whether the user meant "four", or "for". If the user is entering text into an input field that has a phone number schema attached to it and is defined by a grammar that accepts numbers, then it is likely that the user meant the word "four". Thus, the speech recognition input method editor will recognize that it should enter the numeral "4" into the input field.

Figure 2:
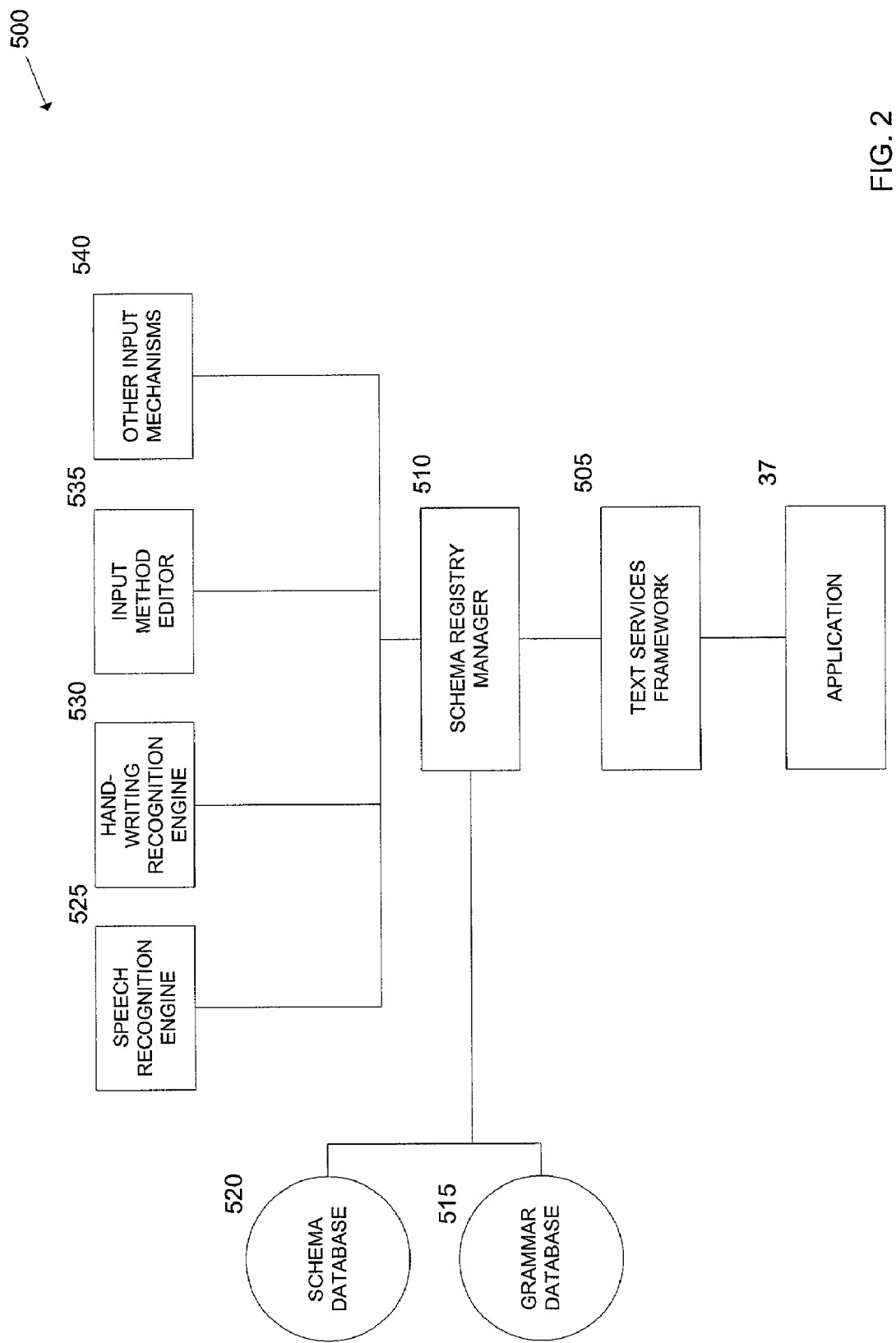
FIG. 2 is a block diagram illustrating an architecture for implementing mode bias in accordance with an embodiment of the present invention.

FIG. 2 illustrates an architecture 500 for implementing mode bias in accordance with an embodiment of the present invention. An application, such as application 37, is connected to a text services framework 505. The text services framework allows input from stochastic input sources. The text services framework is an application programming interface (API) set that allows input sources to communicate with applications. The text services framework is the successor to both the IMM32 (East Asian input method API for the WINDOWS operating system) and AIMM (active input method manager). The text services framework provides numerous advantages over IMM32 and AIMM such as wider access to context, the ability to associate arbitrary properties with text, etc. Although the text services framework is used in one embodiment of the invention, it should be understood that in other embodiments the invention may include other tools for connecting the application to different input methods.

The application 37 may optionally support semantic categories as described below. Input methods, such as a speech recognition engine 525, a handwriting recognition engine 530, input method editors 535 and other stochastic input mechanisms 540 (e.g. sign language recognition) allow the user to enter text into a document of application 37 via the text services framework 505. Other input mechanisms such as gesture-based recognition engines that determine input based on movements or gestures of the user may be used. Input methods such as the keypad of a cellphone or personal digital assistant (PDA) may also be used.

The text services framework 505 and the different input methods are connected to a schema registry. In a preferred embodiment, the schema registry comprises a schema registry manager 510 connected to a grammar database 515 and a schema database 520.

In a preferred embodiment, the schema database comprises a plurality of XML schema used to control mode bias. XML schema are preferably used because they're general and flexible and are already being used for semantic category information (semantic categories are described below). XML schema may also be customized as needed to extend the present invention to new types of data (for example, part numbers within a large organization that conform to a standardized syntax). Although new schema will need to be defined for some inputs, standard schema used in semantic categories may be reused as schema in the present invention.

In order to maximize the ability to reuse grammars for standard broadly applicable types of input controls (such as phone numbers) and for types of input controls that are standard within an organization (such as part numbers), in a preferred embodiment of the present invention the schema either refer to grammars directly or map to them via the schema registry that associates each schema with a particular grammar. For example, the schema names may be referred to in the schema database 520 along with an associated grammar(s) for the schema name. The grammars themselves may be stored in the grammar database 515. One advantage of this indirect mapping approach is that it allows for additional abstraction across, for example, language or region. For example, a field may specify that it accepts phone numbers without needing to build the grammars for different phone formats for each user locale. The schema registry manager 510 controls both the schema database 520 and the grammar database 515. Of course, other architectures will be apparent to those skilled in the art and may be implemented without departing from the present invention.

In other embodiments, the XML schema could directly encode the grammar, but that would make sharing of grammars more difficult. For example, to directly encode the grammar, the XML schema could include the grammar in the form of XML tags that described the list of or form of acceptable input (rather than pointing to a grammar file such as numbers.xml).

Having a schema registry system is beneficial because it easily allows independent software vendors and sophisticated users to modify existing schema or define their own schema and have them used within applications by input methods and for semantic category recognition immediately—that is, without waiting for the next version of the application or input method that is savvy about this new schema. For example, a developer within an organization may notice that users are having a difficult time entering certain types of input when using stochastic input methods (such as when entering part numbers that are specific to the organization). So, the developer may create a new schema to describe part numbers and a grammar to recognize these part numbers. The developer may then attach this schema to form fields in their application and their web pages. The end user may do this as well by annotating a field in a form he created with this new schema.

The schema registry may include entries like those in the first two columns in Table 1 below. The third column explains what the grammar is meant to do. In some cases the grammar may be built dynamically based on the contents of the user's computer, exchange server, etc. Thus, one way that the present invention constrains an input method to adhere to a particular pattern is to specify a grammar that the input method should use. In other words, the invention specifies a regular expression, context free grammar (CFG) or statistical language model that the input method should use. It should be understood that Table 1 is illustrative only and does not limit the number or types of schemas that may be used in the present invention.

TABLE 1

| Schema name (namespace#tag) | Grammar | Interpretation of grammar |
|---|---|---|
| Schemas-microsoft-com-modes#date | A simple regular expression: (January\|February\|March\| ...) digit digit | Permits dates to be entered in Month Date format (e.g. January 12) |
| Schemas-microsoft-com-modes#personname | A context free grammar (CFG) built from the union of the contacts list, the global address book, and lists of first and last names | Almost any name |
| Schemas-microsoft-com-modes#contact | A CFG built exclusively from the contents of the contacts list | Any name in the contacts folder |
| Schemas-microsoft-com-modes#global_address_list | A CFG built exclusively from the contents of the global address list (GAL) | Employees of the company the user works in |
| Schemas-microsoft-com-modes#number | Digit+ | An arbitrary sequence of digits |
| Schemas-microsoft-com-modes#legalText | A statistical language model (SLM) for legal text entry | Allows entry of legal text |

Thus, in one embodiment, the schema registry comprises an XML schema name (comprising a namespace and a tag) and a grammar associated with the XML schema name. The schema registry may also comprise other defining properties that are necessary to determine which grammar to use. A language setting and a locale setting may be used in the schema registry to further define which grammar to use. For example, an address schema may be associated with several different grammars. The grammar that should be sent to the input method may be determined by looking at the language and locale of the computer (or operating system, application, etc.) and then performing a database look-up in the schema registry to locate the appropriate grammar. The schema registry may also include a semantic category setting to indicate whether a particular schema name and grammars should be used for semantic category recognition (as described further below).

The schema registry may be hierarchical. In other words, several hierarchical schemas may be associated with an input control. For example, searching for particular names, such as those in the contacts folder, may be helpful in some cases. However, ruling out other names may be too extreme. As a result, an input field might best be described as expecting input biased towards names in the contacts folder but permitting other names to be entered. Organizing schemas hierarchically addresses this. For example, the Personname schema may be at the top of the name hierarchy while a contacts schema and corporate employee schema may be hierarchically below the Personname schema. A large organization may define the corporate employee schema to make it easier to enter employee names into form fields. Thus, in this example, when a field calls for a Personname schema, the contacts schema and corporate employee schema may be searched before searching for other person's names. In other words, the schemas may be hierarchical in that each schema may return a grammar to the input method and the input method may prefer the most specific schema or otherwise combine the schemas.

There are also cases where a user might try to fill out a form that asked for a schema that the user's machine doesn't know about. For these cases, an embodiment of the present invention may specify an ordered sequence of preferred schemas. The best schema would then be used if it was in the registry or if it could be downloaded in time. However, if it was not available the input method may fall back on the second favorite schema, and so on. For example, a user may try to fill out a form which requests the type Microsoft part number, but the user might not have that type of schema (and/or grammar associated with the schema) on their machine. Much better than allowing arbitrary input then would be to fall back on sequences of letters and digits rather than arbitrary input, which might be predisposed to favor words (as is the case for most speech engines).

Figure 3:
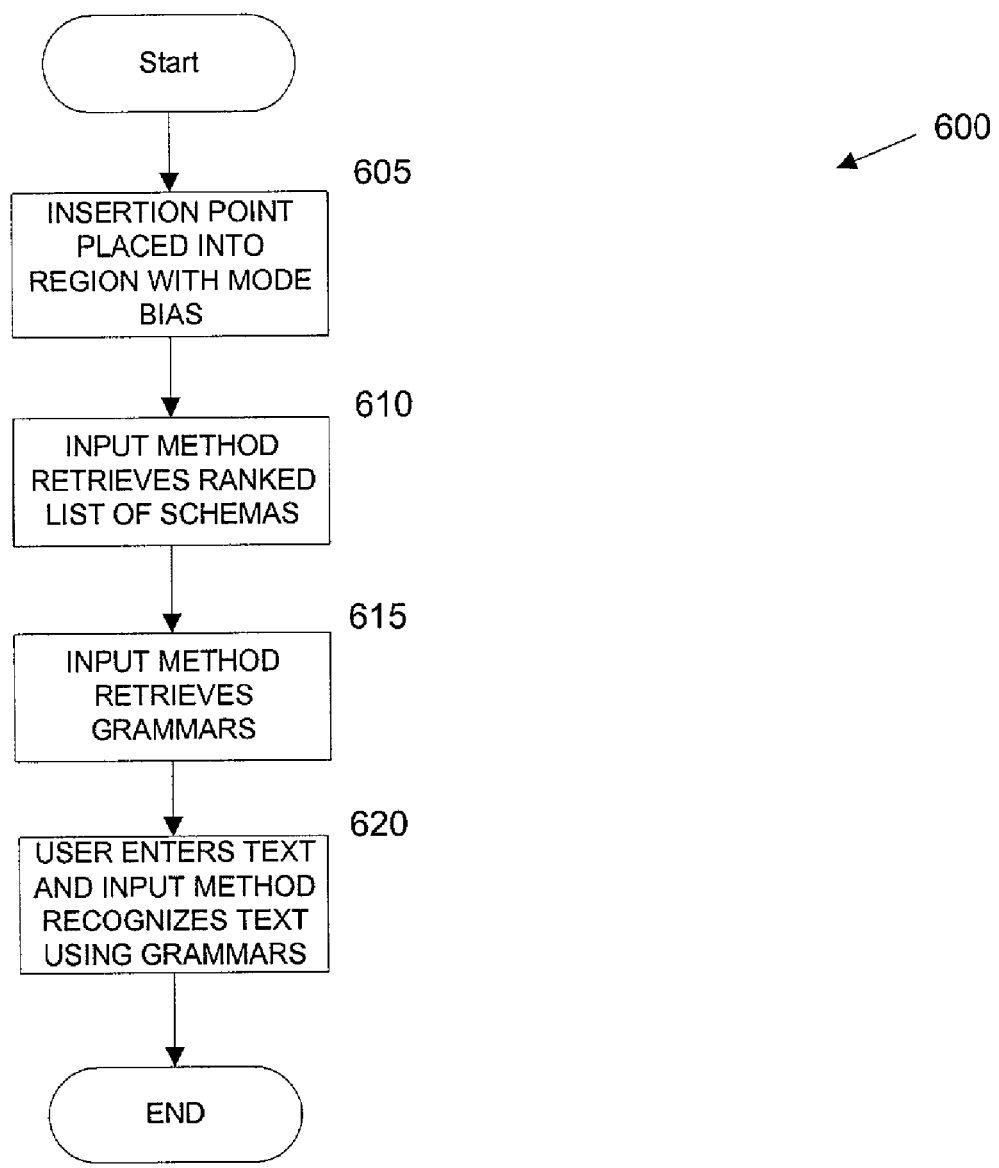
FIG. 3 is a flowchart illustrating a method for applying mode bias to text in accordance with an embodiment of the present invention.

Having briefly described an architecture for implementing the present invention, a flowchart illustrating a method 600 for applying mode bias to text in accordance with an embodiment of the present invention will be described in reference to FIG. 3. It should be understood that the method 600 occurs in an application after the author of a template (or form), or the creator of an application, attaches mode bias to a region of text or a field. A tool such as the "VISUAL STUDIO" application or another similar tool may be provisioned in the future to allow an author to apply such mode bias.

At step 605, the insertion point (IP) is placed into a region of an electronic document with mode bias attached (such as an XML schema attached). At step 610, the input method the user is using retrieves the ranked list of mode biases (schemas) (e.g. best schema=Microsoft employee, $2^{nd}$ best=person name) from the application 37 through the operating system. At step 615, the input method (or operating system) calls into the schema registry and retrieves the grammars associated with the highest ranked schema. Alternatively, the input method (or operating system) calls into the schema registry and retrieves all of the grammars associated with all of the schemas associated with the insertion point region.

At step 620, the user enters text using an input method and the input method recognizes text using the grammars from the registry. Text is inserted into the application as the input methods use the grammars to determine what the user is inputting. The schema, or series of schema, may also be inserted into the document along with the text. When the document is saved, the text is saved, and in some cases so is the schema applied to that text.

It should be understood from the foregoing description that if a document managed by an application has mode bias set on a particular field (or region within a document) that information would be conveyed to the input method. In a preferred embodiment, the information is conveyed from the application through the text services framework. However, it should be understood that other methods of conveying this mode bias information to the input method may be used without departing from the present invention. After receiving the information, the input method would then interface with the schema registry manager in order to identify an appropriate grammar in the grammar database to use. Typically, the input method requests that the schema registry manager return a grammar for the XML tag used to apply mode bias in the document. The schema registry manager would then pass this grammar (or more likely a pointer to it) to the input method for use in determining the user's input.

Thus, in one embodiment, the invention provides a mechanism for using schema (XML tags) to apply mode bias to inputs. The schema tags are used by a stochastic input method to retrieve grammars for use during user input. The grammars define what may be input into certain fields. For example, a form may specify that it accepts part numbers by attaching <schemas-microsoft-com#partnumber> to the control. That schema may be associated with a grammar that specifies that this specific sort of part number comprises a digit from 0 to 9 follow by a letter from a-z. That grammar would constrain the user's input to match that form of part number. The input method would then be able to understand what the user is attempting to input and may provide hints, examples or error messages if the user attempts to enter input that does not match the form defined by the grammar. The same grammar could also be used to recognize part numbers and apply the <schemas-microsoft-com#partnumber> semantic category to free text the user edits (as will be described below). It should be understood that the schema <schemas-microsoft-com#partnumber> is only one example. Schemas may be widely defined and the above example is not meant to limit the schemas in any way.

In one embodiment of the present invention, the schema registry manager itself may be responsible for generating grammars, e.g., the schema may point to code for generating the grammar. This embodiment may be particularly useful for grammars that depend on dynamic databases, such as company e-mail addresses. Rather than having to update each user's computer with revisions to the e-mail addresses, an administrator may set the schema to point to code for generating the grammar so that the latest e-mail addresses may be retrieved.

An application may provide properties along with schema. The properties may be used to limit or further define a proper input for the input field. For example, the schema may be a telephone number and the properties are that it is not a telephone number beginning with the (555) area code. The schema registry manager may interpret the properties to modify the grammar or modify which selections of grammars are sent to the input method.

The use of XML schema and grammars has been described above with regard to applying mode bias to input fields. After XML schema and grammars have been implemented as described above, they may be used to drive recognition of semantic categories because the same grammars used during input with a stochastic input method can be used after text is entered to identify semantic categories.

Semantic Category Recognition Using Grammars

Some of the grammars described above in relation to mode bias may be used for recognition of semantic categories. In a preferred embodiment, a semantic category comprises a type label, a download URL and metadata that is associated with a string that is recognized in a document. A string is a data structure composed of a sequence of characters usually representing human-readable text. When a user enters a string into a document, semantic categories may be labeled for the string and specific actions may be presented to the user in association with the semantic categories. For example, when a user enters the title of a book into a document, it may be labeled as a book and certain actions such as "Buy the book" may be presented to the user based on the labeling.

Before proceeding with a description of using grammars to recognize semantic categories, a more detailed description of semantic categories is provided below. Semantic categories are discussed further in U.S. patent application Ser. No. 09/588,411, entitled "METHOD AND SYSTEM FOR SEMANTICALLY LABELING STRINGS AND PROVIDING ACTIONS BASED ON SEMANTICALLY LABELED STRINGS", filed Jun. 6, 2000, which is commonly assigned and incorporated by reference herein.

To implement semantic categories, strings are recognized and annotated, or labeled, with a type label. After the strings are annotated with a type label, application program modules may use the type label and other metadata to provide users with a choice of actions. If the user's computer does not have any actions associated with that type label, the user may be provided with the option to use a download Uniform Resource Locator (URL) and download action plug-ins for that type label.

Figure 4:
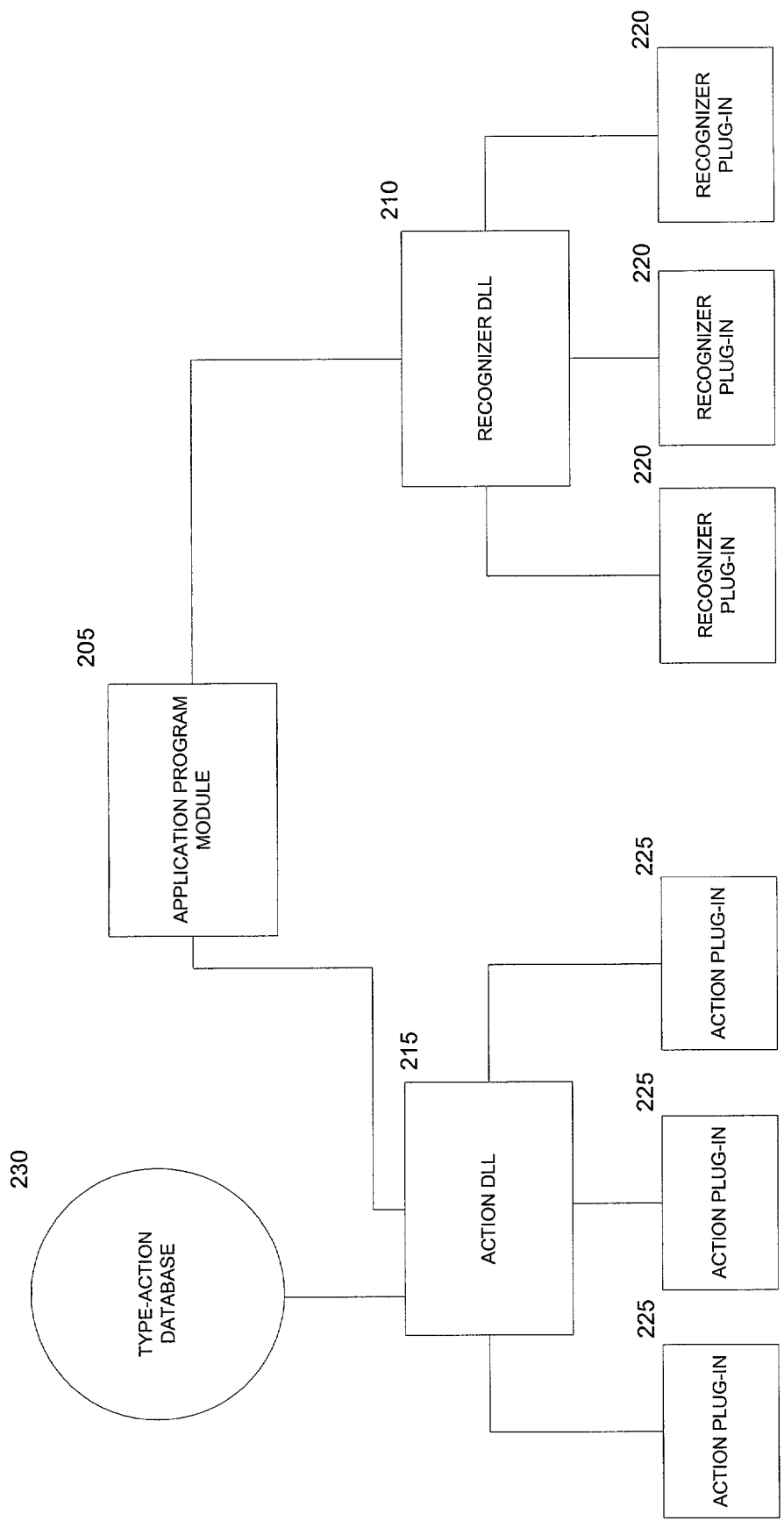
FIG. 4 is a block diagram illustrating an exemplary architecture for implementing semantic categories.

FIG. 4 is a block diagram illustrating an exemplary architecture 200 for use in conjunction with labeling semantic categories in a document. The architecture includes an application program module 205, such as program module 37 (FIG. 1). The application program module 205 is able to communicate with a recognizer dynamic-link library 210 (hereinafter recognizer DLL) and an action dynamic-link library 215 (hereinafter action DLL) as a user is creating, editing, viewing, etc. an electronic document. The recognizer DLL 210 controls a number of recognizer plug-ins 220. The action DLL 215 controls a number of action plug-ins 225. The action DLL also controls a type-action database 230.

The recognizer DLL 210 handles the distribution of strings from the electronic document running on the application program module 205 to the individual recognizer plug-ins 220. The recognizer plug-ins 220 recognize particular strings in an electronic document, such as a word processing document, a spreadsheet document, a web page, etc. The recognizer plug-ins 220 may be packaged with the application program module 205 or they may be written by third parties to recognize particular strings that are of interest. Typically, the recognizer DLL 210 passes strings to the recognizer plug-ins 220 in one paragraph or cell value increments. It should also be understood that, in a preferred embodiment, the action DLL and recognizer DLL are merged into a single DLL.

As part of recognizing certain strings as including semantic information, the recognizer plug-ins 220 determine which strings are to be labeled and how they are to be labeled. After receiving these results from the various recognizer plug-ins 220, the recognizer DLL 210 sends semantic categories to the application program module. In a preferred embodiment, a semantic category comprises the recognized string, a type label, and a download URL. A semantic category may also comprise metadata. The recognizer plug-ins 220 each run separately and the recognizer DLL 210 is responsible for handling the asynchronicity that results from different recognizer plug-ins returning results with different delays.

After a string is labeled by a recognizer plug-in 220 and a semantic category is sent to the application program module 205, the user of the application program module 205 will be able to execute actions that are associated with the type label of the semantic category. The action DLL 215 manages the action plug-ins 225 that are run to execute the actions. As with the recognizer plug-ins 220, the action plug-ins 225 may be packaged with the application program module 205 or written by third parties to perform particular actions that are of interest to the third party. The action plug-ins provide possible actions to be presented to the user based upon the type label associated with the string. The action DLL 215 determines what type label the semantic category includes and cross-references the type label in the type-action database 230 with a list of actions to determine what actions to present to the user. It should be understood that, in a preferred embodiment, the type-action database is not used. Instead, the list of actions is dynamically generated for each type by looking in the registry to determine which actions are installed and then querying the action DLLs to determine which types they apply to.

After the user chooses an action, the action DLL 215 manages the appropriate action plug-ins 225 and passes the necessary information between the action plug-ins and the application program module 205 so that the action plug-in may execute the desired action. Typically, the application program module sends the action DLL an automation request to invoke the action the user has selected.

As described above, the combination of the recognized string, type label, metadata and download URL is referred to herein as a semantic category. The type label is a semantic information label. The semantic category may also comprise metadata, which are hidden properties of the semantic category. An example of a semantic category may clarify the definition. Suppose a user enters the text "Gone With the Wind" into an electronic document. The string "Gone With the Wind" may be identified as a semantic category of type label "Book Title" and of type label "Movie Title". In addition, metadata such as the ISBN number may be returned by the recognizer plug-in to the application program module as part of the semantic category. A download URL may be provided with the type labels "Book Title" and "Movie Title" in case the user's machine has not stored action plug-ins for these type labels. For example, an action for the type label "Book Title" may be "Buy this Book" from an online retailer. If the user does not have the action plug-in DLL 225 corresponding to "Buy this book", then the download URL may be used to navigate the user's web browser to an appropriate website to download this action plug-in. In other implementations of the invention, multiple download URLs may be provided for a single type label.

Having described an exemplary architecture, an exemplary method 300 for semantically labeling strings during document creation will be described below in reference to FIGS. 4 and 5.

Figure 5:
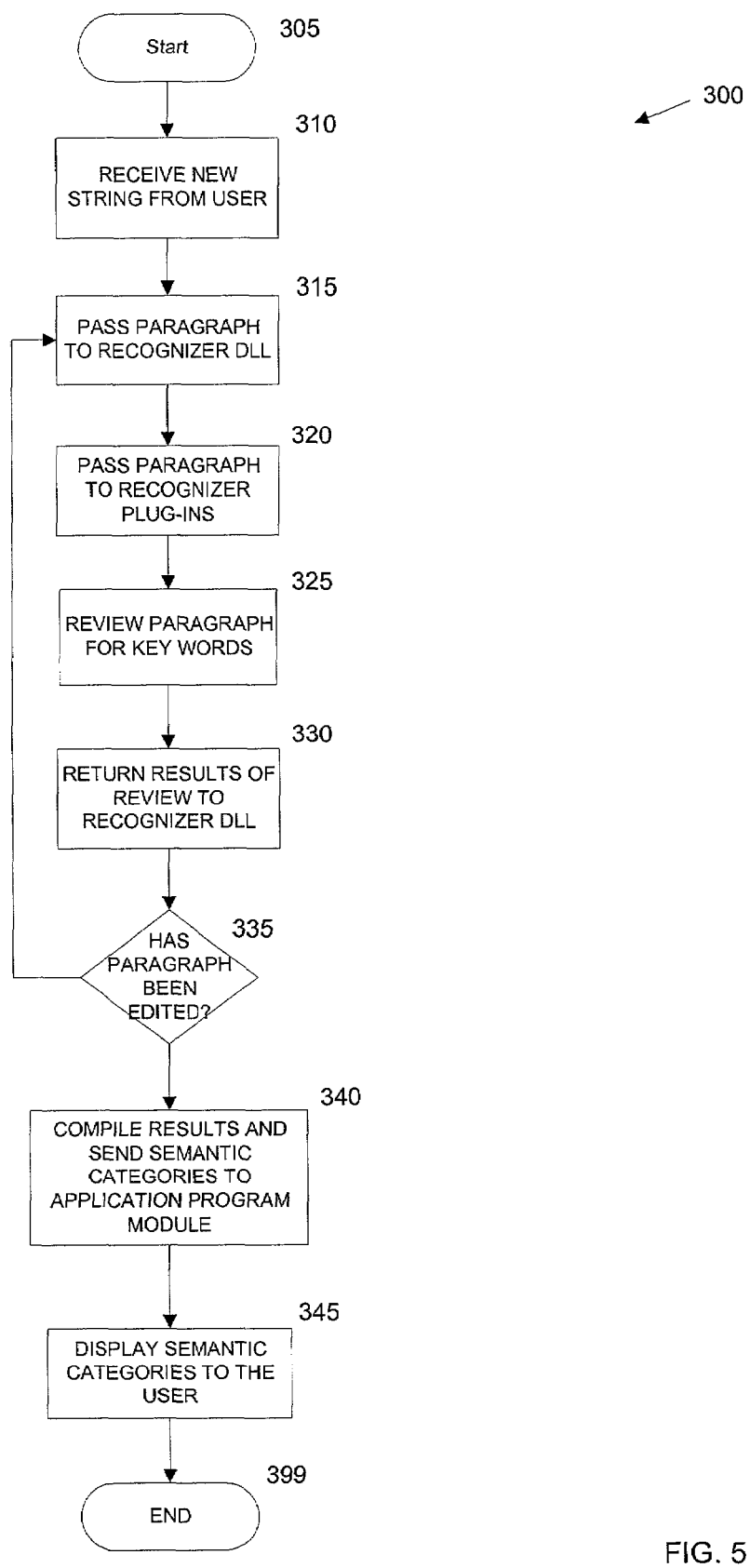
FIG. 5 is a flow chart illustrating a method for semantically labeling strings during creation of an electronic document.

FIG. 5 is a flow chart illustrating a method 300 for semantically labeling strings during creation of an electronic document. Those skilled in the art will appreciate that this is a computer-implemented process that is carried out by the computer in response to input from the user and instructions provided by a program module.

Referring to FIG. 5, the method 300 begins at start step 305 and proceeds to step 310 when a user opens an electronic document in application program module 205. In a preferred embodiment, the electronic document is a word processing document or a spreadsheet document. However, the method 300 is not limited to either of these specific types of electronic documents.

At step 310, the application program module 205 receives a new string, such as when the user enters a new paragraph into the electronic document or edits a previously entered paragraph. The method 300 then proceeds to step 315.

At step 315, the paragraph containing the new string is passed from the application program module 205 to the recognizer DLL 210. The recognizer DLL is responsible for communicating with the application program module, managing the jobs that need to be performed by the recognizer plug-ins, receiving results from the recognizer plug-ins and sending semantic category information to the application program module. At boot time, the recognizer DLL communicates with its recognizer plug-ins to determine what languages it supports, what types it can apply, etc. It should be understood that, in a preferred embodiment, a paragraph is passed to the recognizer DLL at step 315. However, in alternative embodiments, a sentence, the contents of a spreadsheet cell, a section of the document, the entire document, etc. may be passed to the recognizer DLL. In other words, the present invention is not limited to simply passing a paragraph to the recognizer DLL. The method 300 then proceeds to step 320.

Still referring to step 315, the application program module 205 typically sends one paragraph at a time to the recognizer DLL. In addition, in a preferred embodiment, a grammar checker program module sends all semantic categories (without type labels) to the recognizer DLL that have been identified by the grammar checker program module. Passing these semantic categories (without type labels) to the recognizer DLL is important because doing so saves each recognizer plug-in from needing to decide whether something is a capitalized string interspersed with function words (a task that would require writing a number of regular expressions: Cap Cap Unc Cap; Cap Unc Cap; etc.). If a label is applied by a recognizer plug-in to a string the grammar checker program module labeled, the grammar checker label will then be removed.

At step 320, during idle time, the paragraph (and information from the grammar checker program module) is passed to the recognizer plug-ins. The method then proceeds to step 325.

It should be understood that, in a preferred embodiment, the recognizer DLL 210 maintains a job queue. If before the recognizer DLL 210 sends the paragraph to the recognizer plug-ins 220 the user edits the paragraph, then the job containing the edited paragraph is deleted and is not sent to the recognizer plug-ins. Then, a new job enters the queue at step 315 after the edited paragraph is received at step 310. This job deletion is necessary to prevent the recognizer plug-ins from performing unnecessary work on a paragraph that has been edited.

At step 325, the recognizer plug-ins are executed on the paragraph to recognize keywords or perform other actions defined by the recognizer plug-in. As part of executing the recognizer plug-in, the paragraph may be broken into sentences by the recognizer plug-in. However, each recognizer plug-in is responsible for its own sentence-breaking. After the keywords are found at step 325, then the method proceeds to step 330.

At step 330, the results from each of the recognizer plug-ins are received by the recognizer DLL. The method then proceeds to decision step 335.

At decision step 335, it is determined whether the paragraph that has been reviewed by the recognizer plug-ins has been edited after the paragraph was sent to the recognizer DLL. If so, then the method 300 returns to step 315 and the edited paragraph is received by the recognizer DLL from the application program module. If not, then the method proceeds to step 340.

At step 340, the results from the recognizer plug-ins are compiled into semantic categories by the recognizer DLL and the semantic categories are sent to the application program module. At step 345, the application program module displays the semantic categories to the user in the electronic document. The method 300 then ends at step 399.

As should be understood from the description above, the architecture for recognizing semantic categories permits third parties to develop recognizer plug-ins to identify strings of one or more particular types. The recognizer plug-ins communicate with the application program module and receive a string from the application program module. The recognizer plug-ins may apply recognition algorithms to the string and communicate the identity of recognized strings back to the application program module.

After a string is labeled with a particular type label, the user will be able to execute action plug-ins that pertain to that type label. The action plug-ins preferably are COM objects that are executed via communication between the application program module and the action DLL. Parameters necessary to execute the action (the HTML of the string labeled as being of a particular type, the HTML of the string representing the current selection) will be passed from the application program module to the action DLL and, in turn, passed to the action plug-in.

An architecture for identifying and executing a set of actions associated with a semantic category may also be provided. This architecture comprises actions that apply to a particular type label (e.g. an action for book titles may be "Buy this book from shop.Microsoft.com") and executing those actions when the user so desires. An action is a user-initiated function applied to a typed string. For example, adding a name to the contacts folder is one action possible for a type label "Person name".

Different actions may be assigned to different type labels and these type label-action assignments may be stored in the type-action database 230. Table 2 below illustrates some possible type label-action pairings.

TABLE 2

| Type Labels | Actions |
| --- | --- |
| Person name | Show contact info |
| | Add to contacts |
| | E-mail |
| | Insert address into document |
| | Send instant message to |
| Date | Show calendar for that day |
| | New task with that due date |
| | Schedule meeting that day |
| Place | Display EXPEDIA map |
| | Add to contacts |
| Address | Add to contacts |
| Phone number | Add to contacts |
| E-mail | Add to contacts |
| Date | Schedule a meeting |
| Task | Schedule a task |
| Meeting | Schedule a meeting |

For each type label, the type-action database 230 may store a download URL specified by the creator of the type label that users who do not have action-plug-ins or recognizer plug-ins for that semantic category type can go to in order to get action plug-ins and/or recognizer plug-ins. For example, the download URL for the type label "Book Title" might be microsoft-.com/semanticcategories.asp. Once at that web page, a user may be offered downloads of various action plug-ins and recognizer plug-ins. There may also be an option on the user interface to navigate to the download URL so that recipients of documents with semantic categories can easily get the action plug-ins for those semantic categories.

Semantic categories may be saved as a unique namespace plus a tag name. A namespace is an XML construct for uniquely identifying a group of XML tags that belong to a logical category. Thus, every semantic category is uniquely identified by its nametag (e.g., "streetname") in addition to its namespace (e.g., "schemas-microsoft-com:outlook:contact")

Although the method 300 described above is one method for identifying semantic categories, there may be other mechanisms for identifying semantic categories. One mechanism is a grammar checker program module (not shown) connected to word processor program module 37. Another mechanism is receiving a semantic category from another electronic document. For example, when text containing a semantic category is copied from one electronic document and pasted into another electronic document of the word processor program module 37, the information identifying the semantic category is preserved and copied along with the copied text.

Figure 6:
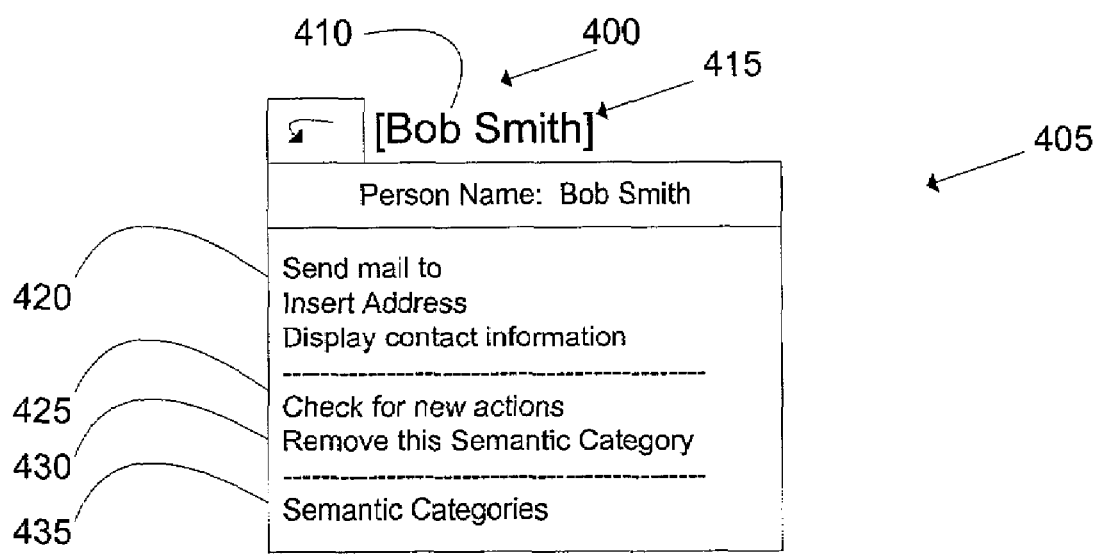
FIG. 6 is an illustration of a display of a semantic category and its associated dropdown menu.

Referring now to FIG. 6, an illustration of a display of a semantic category 400 and its associated dropdown menu 405 will be described. It should be understood that FIG. 6 is an illustration of a semantic category 400 and dropdown menu 405 as displayed to a user by the application program module 205.

The string 410 associated with semantic category 400 is the string "Bob Smith". As shown in FIG. 6, the string 410 of a semantic category 400 may be identified to the user by brackets 415. Of course, many other devices such as coloring, underlining, icons, etc. may be used to indicate to the user that a particular string is a semantic category.

In a preferred embodiment, when the user hovers a cursor over the string 410 or places the insertion point within string 410, then dropdown menu 405 is displayed to the user. The dropdown menu may display a list of actions associated with a semantic category. The dropdown menu may appear above and to the left of the semantic category string.

Typically, the first line of the dropdown menu indicates which string is the semantic category string (Bob Smith in FIG. 6) and what type the semantic category is (Person name in FIG. 6). Listed below the first line are actions 420 available for the semantic category type, such as "Send mail to . . . ", "Insert Address", and "Display contact information . . . ".

The first item on the drop down menu below the separator line is "Check for new actions . . . " 425. "Check for new actions . . . " 425 will appear only for semantic categories whose download URL is available to the application program module. If selected, "Check for new actions . . . " 425 uses the semantic category download URL to navigate the user's web browser to the homepage for the semantic category type applied to the string. For example, suppose new actions have been defined for the semantic category type "person name". If so, then new actions will be downloaded to the user's computer after selecting "Check for new actions . . . " 425. "Check for new actions . . . " 425 will be grayed out if a download URL is unavailable for the semantic category.

If selected, the "Remove this semantic category" item 430 deletes the semantic category label from the string. If selected, the "Semantic categories" item 435 navigates the user to the semantic categories tab of the autocorrect dialog.

It should be understood that the application program module sends a request to the action DLL to determine which actions are shown with each semantic category type.

As described above with reference to FIG. 6, the application program module may include the option to display an in-document user interface to indicate the location of semantic categories. This in-document user interface may use a colored indication to indicate the location of a semantic category, such as the brackets 415 in FIG. 6. The in-document user interface will also be able to show nesting of semantic categories. For example, if Michael Jordan is labeled as a semantic category with type label "Person Name", Michael is a semantic category with type label "First Name" and Jordan is a semantic category with type label "Last Name", the document may look like this with the brackets indicating semantic categories:

[[Michael][Jordan]]

Of course, the in-document user interface may be any sort of indication. For example, in the "EXCEL" spreadsheet application program, the interface comprises a triangle in the lower right hand portion of a cell to indicate that one or more semantic categories are present in the cell.

As described above, the semantic category may also include metadata returned by the recognizer plug-ins. For example, a recognizer plug-in that recognizes the titles of books may return as metadata an ISDN book number when it recognizes the title of a book. The ISDN book number metadata may then be used to provide actions. Metadata may also be used to disambiguate for actions and searches. For example, suppose a recognizer DLL is linked to a corporate employee database to recognize names. When the recognizer DLL recognizes "Bob Smith", it may store "employeeID=12345" as metadata in the background. Then, when an action is fired, the text in question will be known to reference Bob Smith, employee no. 12345 rather than Bob Smith, employee no. 45678. Also, the metadata may allow searches to be performed independent of the actual text in a document. So, a search may be conducted on "Robert Smith" by looking for employee 12345 in the employee databases and by performing a search on the metadata for employee number 12345 to find documents with "Bob Smith" in them. There are also numerous other functions for metadata. For instance, DHTML could be inserted so special tricks may be performed within a web browser. Additionally, data used by other actions may be inserted such as someone's e-mail address that could be used by the send-mail-to action, a normalized version of the date could be stored to easily interact with a personal information manager, etc.

Having described semantic categories in detail above, the description below focuses on providing semantic category recognition using grammars and XML schemas that are also used to apply mode bias. It should be understood that, in addition to applying mode bias as described above, the application 37 (assuming it supports semantic categories) would also be passing text to the set of recognizer plug-ins via the infrastructure described in FIG. 4. One or more of the recognizer plug-ins may be connected to the grammar database 515 and schema database 520. These recognizer plug-ins may use the grammars in the grammar database to recognize semantic categories. In a preferred embodiment, only certain grammars are designated for use for semantic category recognition and the list of the designated grammars would be obtained from the schema registry manager. A more detailed description of using grammars to recognize semantic categories is provided below.

Figure 7:
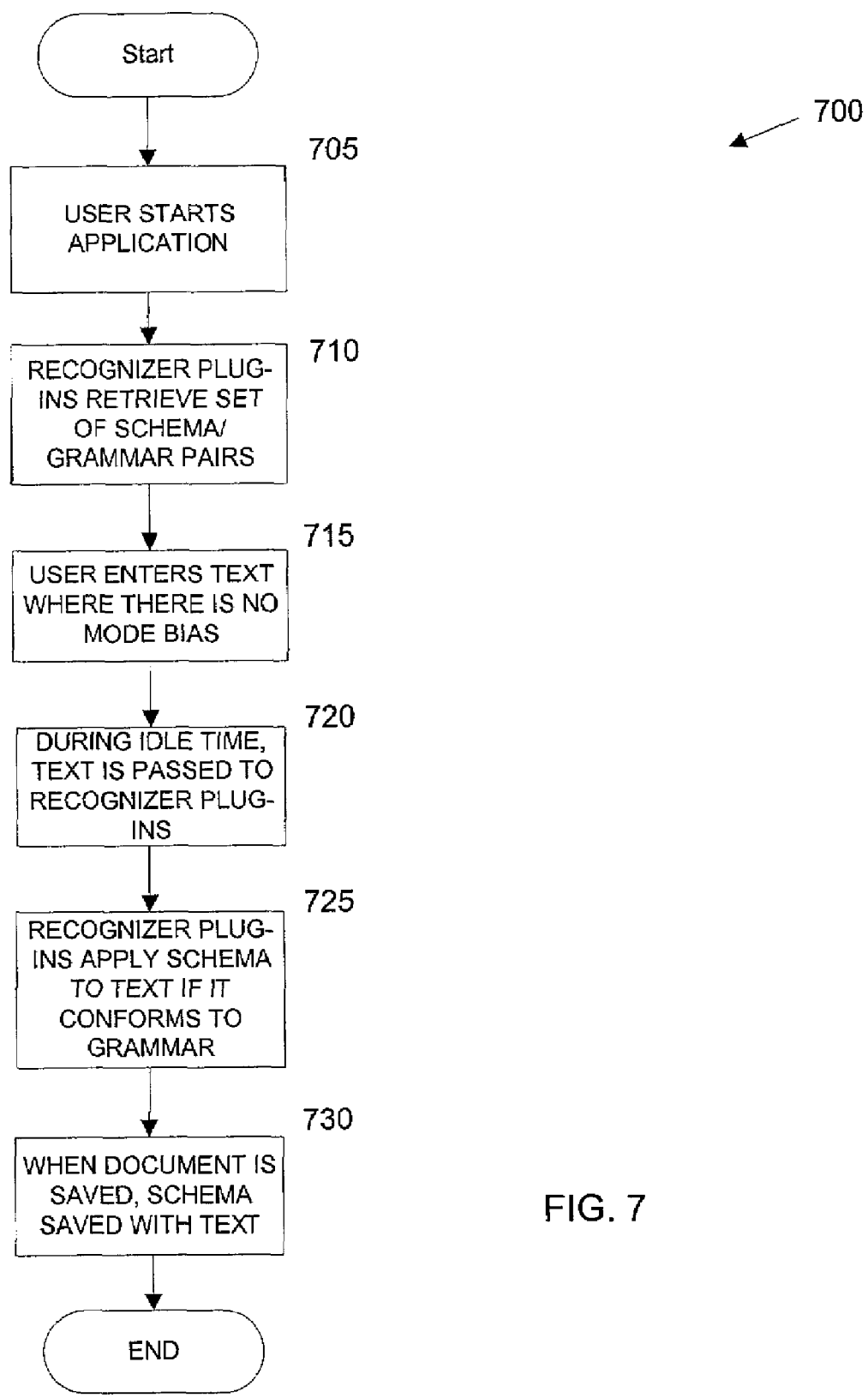
FIG. 7 is a flowchart illustrating a method for semantic category recognition using grammars in accordance with an embodiment of the present invention.

Referring now to FIG. 7, a flowchart illustrating a method 700 for semantic category recognition using grammars in accordance with an embodiment of the present invention will be described. At step 705, the user starts an application that in turn boots several recognizer plug-ins. At step 710, one or more of the recognizer plug-ins communicates with the schema registry manager and retrieves a complete set of schema/grammar pairs to use for semantic category recognition. At step 715, the user enters some text in a place in a document where there is no mode bias. At step 720, during idle time, the text is passed to the recognizer plug-ins. At step 725, the recognizer plug-ins apply the schema from the schema registry to the text if the text conforms to the grammars found in the schema registry. At step 730, when the document is saved, the text is saved along with the schema applied to that text. Thus, as will be understood from the foregoing description, the schema has been used to label the text as a semantic category. The action plug-ins may then use this schema to provide actions.

Thus, as described above, applying mode bias in accordance with the present invention may also be related to recognizing semantic categories. Recognizing semantic categories requires determining what category some text is in after it is entered whereas applying mode bias requires specifying in advance what type of text will be entered. The same rules or statistical models (grammars) can be used to recognize semantic categories by determining if the text matches any of the rules and for specifying mode bias by constraining input with a probabilistic input method to conform to those rules.

Thus, in one embodiment of the present invention, once the user has entered a phone number into a field that has phone number mode bias set, the fact that that field contains a phone number is retained. Thus, the fact that the field is a phone number will be apparent to whatever person (such as a user who requests a list of actions pertinent to that data type) or process (e.g. a search engine) looks at the document later. Moreover, if the user had entered a phone number in an arbitrary location in a document—that is, in a place where there was no a priori specification of mode bias—the phone number will be labeled as such by recognizer plug-ins. That is, once the mode bias mechanism of the present invention is in place, a recognizer plug-in may identify many of the items in the schema registry using the same patterns that are used for input. However, not all of the grammars necessarily have to be used because some grammars may be for particular genres of text, such as legal text or medical text, or even something as specific as case law text. There may be little use in labeling all text that appears to be from one particular genre. Similarly, some grammars are so generic as to be useless. For example, generic types such as numbers may not facilitate good semantic category actions.

Thus, it should be understood from the foregoing description that the same grammar could be used to apply mode bias and also to recognize semantic categories. Leveraging this relationship is advantageous for developers who will have fewer grammars to build and for users who will receive better input and richer functionality via semantic categories. In addition, the relationship between mode bias and semantic categories maximizes consistency because if something is labeled as a part number semantic category then you should be able to enter it when a form requests a part number and vice versa.

It should be understood from the foregoing description that it is important to have a standard way to specify that input into a particular region of a document or form should conform to some pattern because the expected input is of a particular type or has particular properties. The present invention provides a way to specify that input into a particular region of a document or form should conform to some pattern. For example, when entering a telephone number into a telephone number field of contact management software, the user will almost certainly enter a well-formed phone number and whatever input method they're using should make that as easy as possible. The exact form of the phone number may differ depending on the user's location, but wherever the user is in the world, it's unlikely that they'll expect to be able to enter free text into a telephone number field.

It should be understood that tools other than input methods, such as speech, handwriting or East Asian input method editors, also need to know about mode bias. For example, proofing tools such as spelling, grammar and style checkers should be able to adapt to the mode bias of the present invention to some extent. For example, if text is entered into a form that has mode bias using a non-probabilistic input method (such as typing English), then whatever proofing tools are run on that text should be cognizant of the constraints placed on that text by the mode bias. For example, it may make sense to turn spell checking off in fields that allow names to be entered. Or, a speller checker that uses a statistical language model might be able to swap in a more appropriate model with the knowledge that the text is medical or legal in nature.

It should be understood from the foregoing description that the present invention allows all input methods to become standardized in their handling of mode bias. For example, for a telephone number input, a speech recognizer and a handwriting recognizer will receive the same (or a similar) grammar from the schema registry manager. Then, the speech recognizer and handwriting recognizer will be able to handle telephone number inputs similarly and there will be a standardization of input methods. The present invention is also more flexible than the prior art because new schemas and grammars may be added to the databases and may be updated as necessary.

It should be understood from the foregoing description that after an input method receives a grammar, it may use it in many different ways that will be apparent to those skilled in the art. For example, in the case of a context free grammar, an input method may attempt to match what the user said (or typed or handwrote, etc.) with elements of the grammar and, if not present, then reject the input. As another example, the input method may use the grammar as a way to disambiguate words, phrases, etc. (e.g. if the grammar includes the word "two" but not "to", this information may be used to recognize what the user is inputting).

It should be understood that the foregoing pertains only to the preferred embodiments of the present invention, and that numerous changes may be made to the embodiments described herein without departing from the spirit and scope of the invention.

I claim:

1. A computer system for applying mode bias to an input field of an electronic document of an application, the system comprising:
   a mark-up language schema registry in communication with the application, wherein the mark-up language schema registry comprises a schema database and a grammar database, wherein the schema database comprises a plurality of schema names and a plurality of pointers to the grammar database associated with the plurality of schema names, the grammar database comprising a plurality of grammars, wherein the plurality of grammars comprise a first grammar associated with a union of data from a plurality of user data sources, the union of data from the plurality of user data sources being a context free grammar built from a union of a contacts list, a global address book, and a list of first and last names; and
   an input engine in communication with the mark-up language schema registry, wherein the mark-up language schema registry is configured to:
      receive a schema name based on a hierarchical analysis of a textual input to the input field from the application,
      locate a corresponding grammar from among the plurality of grammars comprising one of: a regular expression and a statistical language model, the corresponding grammar having a language setting and a locale setting, and the corresponding grammar being associated with the schema name, and
      send the corresponding grammar to the input engine, wherein the corresponding grammar defines an appropriate input for the input field, and wherein the schema in the mark-up language schema registry is associated with the corresponding grammar by one of: referring to the corresponding grammar directly, mapping to the corresponding grammar, and encoding the corresponding grammar within the schema.

2. The system of claim 1 wherein the input engine is a speech recognition engine.

3. The system of claim 1 wherein the input engine is a handwriting recognition engine.

4. The system of claim 1 wherein the input engine is an input method editor (IME).

5. The system of claim 1 wherein the input engine is a keypad of a cellphone.

6. The system of claim 1 wherein the input engine is a gesture-based input method.

7. The system of claim 1 wherein the input engine is a sign language recognition engine.

8. The system of claim 1 wherein the corresponding grammar is the context free grammar.

9. The system of claim 1 wherein the corresponding grammar is a context sensitive grammar.

10. The system of claim 1 wherein the corresponding grammar defines the appropriate input for the input field by defining a list of acceptable inputs for the input field.

11. The system of claim 1 wherein the input engine uses the corresponding grammar to receive input from a user of the application.

12. The system of claim 11 wherein the input engine further uses the corresponding grammar to bias the user's input toward a correct input for the input field.

13. The system of claim 11 wherein the input engine compares the input of the user to the corresponding grammar to determine whether the input matches and is an appropriate input.

14. The system of claim 13 wherein if the input engine determines that the input of the user does not match an appropriate input, then the input engine rejects the input and causes the application to display an error message to the user.

15. The system of claim 1 wherein the mark-up language schema registry is in communication with the application through a text service framework.

16. The method of claim 1, wherein the plurality of grammars further comprise a second grammar built exclusively from a content of the contacts list.

17. The method of claim 1, wherein the plurality of grammars further comprise a second grammar built exclusively from a content of the global address list.

18. The method of claim 1, wherein the plurality of grammars further comprise a second grammar associated with regular expressions.

19. The method of claim 1, wherein the plurality of grammars further comprise a second grammar associated with statistical language models.

20. A computer system for applying mode bias to an input field of an electronic document of an application, the system comprising:
- a mark-up language schema registry in communication with the application, the mark-up language schema registry operable to point to code for dynamically generating a plurality of grammars, wherein the plurality of grammars are used to define an appropriate input for the input field, wherein each mark-up language schema in the registry is associated with a corresponding grammar by one of: referring to the corresponding grammar directly and mapping to the corresponding grammar, and encoding the corresponding grammar within the schema, and wherein the plurality of grammars comprise:
  - a first grammar associated with a union of data from a plurality of user data sources, the union of data from the plurality of user data sources being a context free grammar built from a union of a contacts list, a global address book, and a list of first and last names,
  - a second grammar built exclusively from a contents list of the contacts list,
  - a third grammar built exclusively from a contents list of the global address list,
  - a fourth grammar associated with regular expressions, and
  - a fifth grammar associated with statistical language models;
- an input engine in communication with the mark-up language schema registry, wherein the mark-up language schema registry receives a schema name from the application through a text service framework, locates an identifier of the corresponding grammar among the plurality of grammars associated with the schema name and sends the located identifier of the corresponding grammar to the input engine, wherein the input engine uses at least one of the plurality of grammars to bias input from a user of the application toward a correctly formatted input, wherein if the input engine determines that the input of the user does not match an appropriate input, then the input engine recommends an alternate input, wherein the input engine is at least one of the following: a speech recognition engine, a handwriting recognition engine, an input method editor, a phone keypad, a gesture-based input method, a keyboard, and a sign language recognition engine; and
- a recognizer library in communication with the application, wherein the recognizer library is configured to apply a semantic category to the textual input.

21. A computer-implemented method for applying mode bias to an input field of an electronic document of an application program module, the method comprising:
- determining that an insertion point is within the input field;
- determining a mode bias schema that is attached to the input field, wherein the determination of the mode bias schema uses a ranked list of mode bias schemas;
- dynamically generating a plurality of grammars based on the input field and a mark-up language schema registry, wherein the plurality of grammars define an appropriate input for the input field, wherein each of the plurality of grammars has a language setting and a locale setting and is associated with a schema name, and wherein the plurality of grammars comprise:
  - a first grammar associated with a union of data from a plurality of user data sources, the union of data from the plurality of user data sources being a context free grammar built from a union of a contacts list, a global address book, and a list of first and last names,
  - a second grammar built exclusively from a contents list of the contacts list,
  - a third grammar built exclusively from a contents list of the global address list,
  - a fourth grammar associated with regular expressions, and
  - a fifth grammar associated with statistical language models;
- determining an appropriate grammar from the generated plurality of grammars that is associated with the mode bias schema; and
- sending the appropriate grammar associated with the mode bias schema to an input engine wherein the input engine uses the appropriate grammar associated with the mode bias schema to receive the appropriate input for the input field.

22. The method of claim 21 further comprising: receiving text at the insertion point and determining whether the received text matches an input type defined by the appropriate grammar and, if so, then displaying the text in the input field.

23. The method of claim 22 further comprising the step of:
- if the text received at the insertion point does not match the input type defined by the appropriate grammar, then displaying an error message.

24. The method of claim 21 wherein determining the appropriate grammar that is associated with the mode bias schema comprises:
- cross-referencing the mode bias schema in a schema database to determine the appropriate grammar that is associated with the mode bias schema.

25. The method of claim 24 wherein sending the appropriate grammar to the input engine comprises retrieving the grammar from a grammar database and sending the grammar to the input engine.

* * * * *